(12) United States Patent
Huang et al.

(10) Patent No.: US 12,021,782 B2
(45) Date of Patent: Jun. 25, 2024

(54) SLOT INDICATION FOR UPLINK CONTROL CHANNEL CARRIER SWITCH

(71) Applicant: QUALCOMM Incorporated, San Diego, CA (US)

(72) Inventors: Yi Huang, San Diego, CA (US); Wanshi Chen, San Diego, CA (US); Krishna Kiran Mukkavilli, San Diego, CA (US); Tingfang Ji, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 247 days.

(21) Appl. No.: 17/451,189

(22) Filed: Oct. 18, 2021

(65) Prior Publication Data

US 2022/0124680 A1    Apr. 21, 2022

Related U.S. Application Data

(60) Provisional application No. 63/198,445, filed on Oct. 19, 2020.

(51) Int. Cl.
*H04L 5/00*      (2006.01)
*H04L 27/26*    (2006.01)
(Continued)

(52) U.S. Cl.
CPC ............ *H04L 5/0053* (2013.01); *H04L 5/001* (2013.01); *H04L 27/26025* (2021.01);
(Continued)

(58) Field of Classification Search
CPC . H04L 5/001; H04L 5/0053; H04L 27/26025; H04W 72/0453; H04W 72/0446
See application file for complete search history.

(56) References Cited

U.S. PATENT DOCUMENTS

| 11,653,413 B2 * | 5/2023 | Tang | H04L 1/1819 |
| | | | 370/329 |
| 2022/0053522 A1 * | 2/2022 | MolavianJazi | H04W 72/1263 |
| 2022/0173878 A1 * | 6/2022 | Nory | H04L 5/0078 |

FOREIGN PATENT DOCUMENTS

| EP | 3169029 A1 | 5/2017 | |
| WO | 2019214668 A1 | 11/2019 | |
| WO | WO-2021066483 A1 * | 4/2021 | ............. H04L 5/001 |

OTHER PUBLICATIONS

Huawei, et al., "Corrections on Cross-Carrier Scheduling with Different Numerology", 3GPP Draft, 3GPP TSG RAN WG1 Meeting #100-e, R1-2001035, 3rd Generation Partnership Project (3GPP), Mobile Competence Centre, 650, Route Des Lucioles, F-06921 Sophia-Antipolis Cedex, France, vol. RAN WG1, No. Feb. 24, 2020-Mar. 6, 2020, Feb. 15, 2020 (Feb. 15, 2020), XP051853573, 9 Pages, Retrieved from the Internet: URL: https://ftp.3gpp.org/tsg_ran/WG1_RL1/TSGR1_100_e/Docs/R1-2001035.zip R1-2001035.docx [Retrieved on Feb. 15, 2020] Section 4.2, page sixth.

(Continued)

*Primary Examiner* — Kevin C. Harper
(74) *Attorney, Agent, or Firm* — Harrity & Harrity, LLP

(57) ABSTRACT

Some techniques and apparatuses described herein enable transmission of an uplink control channel in a cross-carrier fashion, where determination of a slot for the transmission is performed based at least in part on a reference component carrier (CC), of a plurality of CCs. For example, the reference CC may be indicated by scheduling information associated with a downlink channel, or may be determined by the UE (e.g., based at least in part on an order associated with the plurality of CCs and availability of a slot for an uplink control channel on the plurality of CCs). In this way, ambiguity with regard to determination of the slot for transmission of the uplink control channel is reduced, thereby providing improved control channel performance, (Continued)

improved resource utilization, and more robust implementation of cross-carrier uplink feedback.

30 Claims, 13 Drawing Sheets

(51) Int. Cl.
*H04W 72/0446* (2023.01)
*H04W 72/0453* (2023.01)
*H04W 72/20* (2023.01)
*H04W 72/02* (2009.01)

(52) U.S. Cl.
CPC ... *H04W 72/0446* (2013.01); *H04W 72/0453* (2013.01); *H04W 72/20* (2023.01); *H04W 72/02* (2013.01)

(56) References Cited

OTHER PUBLICATIONS

International Search Report and Written Opinion—PCT/US2021/071925—ISA/EPO—Feb. 8, 2022.
Nokia., et al., "On Cross-Carrier Scheduling and Joint UCI Design", 3GPP TSG RAN WG1 NR#2, 3GPP Draft, 3GPP TSG RAN WG1 NR#2, R1-1710885_CA_HARQ_CROSS-NUMEROLOGY, 3rd Generation Partnership Project (3GPP), Mobile Competence Centre, 650, Route Des Lucioles, F-06921 Sophia-Antipolis Cedex, France, vol. RAN WG1, No. Qingdao, China; Jun. 27,2017-Jun. 30, 2017, Jun. 26, 2017, XP051300087, Retrieved from the Internet: URL: http://www.3gpp.org/ftp/Meetings_3GPP_SYNC/RAN1/Docs/ [retrieved on Jun. 26, 2017-], 6 pages.

* cited by examiner

SLOT INDICATION FOR UPLINK CONTROL CHANNEL CARRIER SWITCH

CROSS-REFERENCE TO RELATED APPLICATION

This patent application claims priority to U.S. Provisional Patent Application No. 63/198,445, filed on Oct. 19, 2020, entitled "SLOT INDICATION FOR UPLINK CONTROL CHANNEL CARRIER SWITCH," and assigned to the assignee hereof. The disclosure of U.S. Provisional Patent Application No. 63/198,445 is incorporated by reference herein in its entirety.

FIELD OF THE DISCLOSURE

Aspects of the present disclosure generally relate to wireless communication and to techniques and apparatuses for slot indication for an uplink control channel carrier switch.

BACKGROUND

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power, or the like). Examples of such multiple-access technologies include code division multiple access (CDMA) systems, time division multiple access (TDMA) systems, frequency-division multiple access (FDMA) systems, orthogonal frequency-division multiple access (OFDMA) systems, single-carrier frequency-division multiple access (SC-FDMA) systems, time division synchronous code division multiple access (TD-SCDMA) systems, and Long Term Evolution (LTE). LTE/LTE-Advanced is a set of enhancements to the Universal Mobile Telecommunications System (UMTS) mobile standard promulgated by the Third Generation Partnership Project (3GPP).

A wireless network may include a number of base stations (BSs) that can support communication for a number of user equipment (UEs). A UE may communicate with a BS via the downlink and uplink. "Downlink" (or forward link) refers to the communication link from the BS to the UE, and "uplink" (or reverse link) refers to the communication link from the UE to the BS. As will be described in more detail herein, a BS may be referred to as a Node B, a gNB, an access point (AP), a radio head, a transmit receive point (TRP), a 5G BS, a 5G Node B, or the like.

The above multiple access technologies have been adopted in various telecommunication standards to provide a common protocol that enables different wireless communication devices to communicate on a municipal, national, regional, and even global level. 5G, which may also be referred to as New Radio (NR), is a set of enhancements to the LTE mobile standard promulgated by the 3GPP. 5G is designed to better support mobile broadband Internet access by improving spectral efficiency, lowering costs, improving services, making use of new spectrum, and better integrating with other open standards using OFDM with a cyclic prefix (CP) (CP-OFDM) on the downlink (DL), using CP-OFDM and/or SC-FDM (e.g., also known as discrete Fourier transform spread OFDM (DFT-s-OFDM)) on the uplink (UL), as well as supporting beamforming, multiple-input multiple-output (MIMO) antenna technology, and carrier aggregation. However, as the demand for mobile broadband access continues to increase, there exists a need for further improvements in LTE and 5G technologies. Preferably, these improvements should be applicable to other multiple access technologies and the telecommunication standards that employ these technologies.

SUMMARY

A UE may communicate on multiple component carriers (CCs). For example, a UE may use a carrier aggregation (CA) scheme, in which the UE communicates on a primary CC (also referred to as a primary cell or PCell) and one or more secondary CCs (also referred to as a secondary cell or SCell). Radio resource control (RRC) signaling may be conveyed via the primary CC, so the primary CC may be used to configure the one or more secondary CCs. Traditionally, an uplink control channel, such as a physical uplink control channel (PUCCH), may be conveyed on the primary CC. Some CA schemes may allow for the uplink control channel to be transmitted on a secondary CC. For example, a base station may configure a time division duplexing (TDD) pattern on the primary CC and a secondary CC so that uplink slots are staggered across the primary CC and the secondary CC. Thus, ideally, at least one CC can perform an uplink transmission at any given time. Furthermore, if a secondary CC is a frequency division duplexing (FDD) carrier, then uplink transmission may generally be available on an uplink region of the FDD carrier, thus facilitating transmission of an uplink control channel.

A UE may transmit an uplink control channel associated with a downlink shared channel based at least in part on a slot offset that indicates a number of slots between receiving the downlink shared channel and transmitting the uplink control channel. However, different CCs may be associated with different parameters, such as different numerologies, different subcarrier spacings, and so on. Thus, if a downlink shared channel is received on a first CC, and an uplink control channel corresponding to the downlink shared channel is transmitted on a second CC that is different than the first CC, there may be ambiguity as to how the slot offset should be interpreted. For example, if the first CC has longer slots than the second CC, then the slot offset may indicate a different slot for the uplink control channel if the number of slots is counted on the first CC than if the number of slots is counted on the second CC. This ambiguity may lead to missed uplink control channels, degraded resource utilization, and an impediment to the usage of cross-carrier uplink feedback.

Some techniques and apparatuses described herein provide transmission of an uplink control channel in a cross-carrier fashion, where determination of a slot for the transmission of the uplink control channel on a selected CC of a plurality of CCs is performed based at least in part on a reference slot on a reference CC of the plurality of CCs. For example, the reference CC may be indicated by scheduling information associated with a downlink channel, may be determined by the UE (e.g., based at least in part on an order associated with the plurality of CCs and availability of a slot for an uplink control channel on the plurality of CCs), or may be configured. In this way, ambiguity with regard to determination of the slot for transmission of the uplink control channel is reduced, thereby providing improved control channel performance, improved resource utilization, and more robust implementation of cross-carrier uplink feedback.

In some aspects, a method of wireless communication performed by a UE includes receiving a downlink channel on one of a plurality of CCs included in a group; determining, based at least in part on a reference CC of the plurality of CCs and a slot offset, a selected CC and a slot on the selected CC for transmission of feedback regarding the downlink channel; and transmitting the feedback regarding the downlink channel based at least in part on the slot.

In some aspects, a method of wireless communication performed by a base station includes transmitting a downlink channel on one of a plurality of CCs included in a group; determining, based at least in part on a reference CC of the plurality of CCs and a slot offset, a selected CC and a slot on the selected CC for reception of feedback regarding the downlink channel; and receiving the feedback regarding the downlink channel based at least in part on the slot.

In some aspects, a UE for wireless communication includes a memory and one or more processors coupled to the memory, wherein the one or more processors are configured to: receive a downlink channel on one of a plurality of CCs included in a group; determine, based at least in part on a reference CC of the plurality of CCs and a slot offset, a selected CC and a slot on the selected CC for transmission of feedback regarding the downlink channel; and transmit the feedback regarding the downlink channel based at least in part on the slot.

In some aspects, a base station for wireless communication includes a memory and one or more processors coupled to the memory, wherein the one or more processors are configured to: transmit a downlink channel on one of a plurality of CCs included in a group; determine, based at least in part on a reference CC of the plurality of CCs and a slot offset, a selected CC and a slot on the selected CC for reception of feedback regarding the downlink channel; and receive the feedback regarding the downlink channel based at least in part on the slot.

In some aspects, a non-transitory computer-readable medium storing a set of instructions for wireless communication includes one or more instructions that, when executed by one or more processors of a UE, cause the UE to: receive a downlink channel on one of a plurality of CCs included in a group; determine, based at least in part on a reference CC of the plurality of CCs and a slot offset, a selected CC and a slot on the selected CC for transmission of feedback regarding the downlink channel; and transmit the feedback regarding the downlink channel based at least in part on the slot.

In some aspects, a non-transitory computer-readable medium storing a set of instructions for wireless communication includes one or more instructions that, when executed by one or more processors of a base station, cause the base station to: transmit a downlink channel on one of a plurality of CCs included in a group; determine, based at least in part on a reference CC of the plurality of CCs and a slot offset, a slot for reception of feedback regarding the downlink channel; and receive the feedback regarding the downlink channel based at least in part on the slot.

In some aspects, an apparatus for wireless communication includes means for receiving a downlink channel on one of a plurality of CCs included in a group; means for determining, based at least in part on a reference CC of the plurality of CCs and a slot offset, a selected CC and a slot on the selected CC for transmission of feedback regarding the downlink channel; and means for transmitting the feedback regarding the downlink channel based at least in part on the slot.

In some aspects, an apparatus for wireless communication includes means for transmitting a downlink channel on one of a plurality of CCs included in a group; means for determining, based at least in part on a reference CC of the plurality of CCs and a slot offset, a selected CC and a slot on the selected CC for reception of feedback regarding the downlink channel; and means for receiving the feedback regarding the downlink channel based at least in part on the slot.

In some aspects, a method of wireless communication performed by a UE includes receiving a downlink channel on one of a plurality of CCs included in a group; and transmitting feedback regarding the downlink channel in a slot on a selected CC, wherein the slot on the selected CC is based at least in part on a reference CC of the plurality of CCs and a slot offset.

In some aspects, a method of wireless communication performed by a base station includes transmitting a downlink channel on one of a plurality of CCs included in a group; and receiving feedback regarding the downlink channel in a slot of a selected CC, wherein the slot is based at least in part on a reference CC of the plurality of CCs and a slot offset.

In some aspects, an apparatus for wireless communication includes a memory and one or more processors coupled to the memory, the one or more processors configured to: receive a downlink channel on one of a plurality of CCs included in a group; and transmit feedback regarding the downlink channel in a slot on a selected CC, wherein the slot on the selected CC is based at least in part on a reference CC of the plurality of CCs and a slot offset.

In some aspects, an apparatus for wireless communication includes a memory and one or more processors coupled to the memory, the one or more processors configured to: transmit a downlink channel on one of a plurality of CCs included in a group; and receive feedback regarding the downlink channel in a slot of a selected CC, wherein the slot is based at least in part on a reference CC of the plurality of CCs and a slot offset.

In some aspects, a non-transitory computer-readable medium storing a set of instructions for wireless communication includes one or more instructions that, when executed by one or more processors of a UE, cause the UE to: receive a downlink channel on one of a plurality of CCs included in a group; and transmit feedback regarding the downlink channel in a slot on a selected CC, wherein the slot on the selected CC is based at least in part on a reference CC of the plurality of CCs and a slot offset.

In some aspects, a non-transitory computer-readable medium storing a set of instructions for wireless communication includes one or more instructions that, when executed by one or more processors of a base station, cause the base station to: transmit a downlink channel on one of a plurality of CCs included in a group; and receive feedback regarding the downlink channel in a slot of a selected CC, wherein the slot is based at least in part on a reference CC of the plurality of CCs and a slot offset.

In some aspects, an apparatus for wireless communication includes means for receiving a downlink channel on one of a plurality of CCs included in a group; and means for transmitting feedback regarding the downlink channel in a slot on a selected CC, wherein the slot on the selected CC is based at least in part on a reference CC of the plurality of CCs and a slot offset.

In some aspects, an apparatus for wireless communication includes means for transmitting a downlink channel on one of a plurality of CCs included in a group; and means for receiving feedback regarding the downlink channel in a slot of a selected CC, wherein the slot is based at least in part on a reference CC of the plurality of CCs and a slot offset.

Aspects generally include a method, apparatus, system, computer program product, non-transitory computer-readable medium, user equipment, base station, wireless communication device, wireless communication node, and/or processing system as substantially described with reference to and as illustrated by the drawings and specification.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages will be better understood from the following description when considered in connection with the accompanying figures. Each of the figures is provided for the purposes of illustration and description, and not as a definition of the limits of the claims.

DETAILED DESCRIPTION

Figure 1:
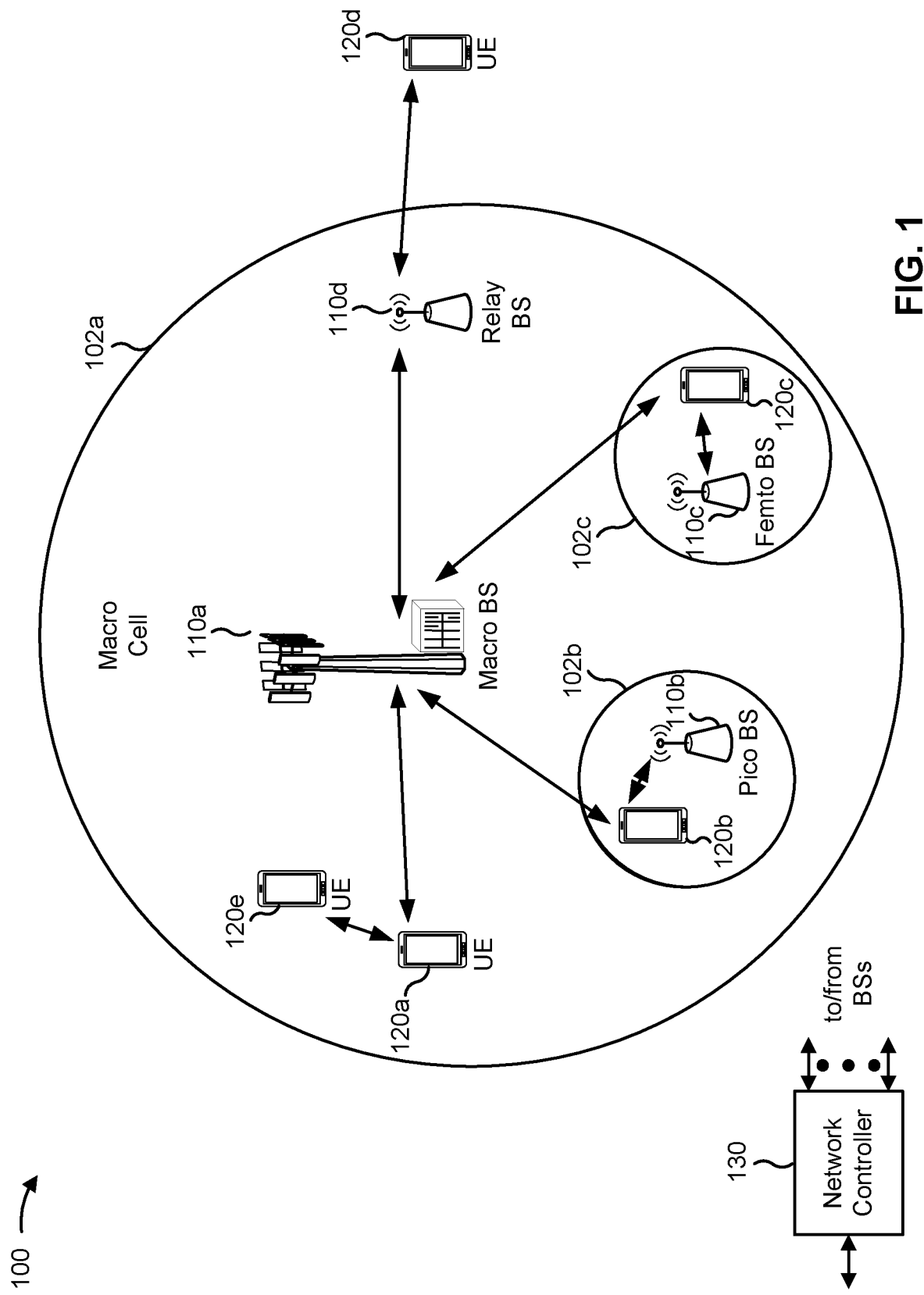
FIG. 1 is a diagram illustrating an example of a wireless network.

The detailed description set forth below in connection with the appended drawings is intended as a description of various configurations and is not intended to represent the configurations in which the concepts described herein may be practiced. The detailed description includes specific details for the purposes of providing a thorough understanding of various concepts. However, it will be apparent to those skilled in the art that these concepts may be practiced without these specific details. In some instances, well-known structures and components are shown in block diagram form in order to avoid obscuring such concepts.

Several aspects of telecommunication systems will now be presented with reference to various apparatus and methods. These apparatus and methods will be described in the following detailed description and illustrated in the accompanying drawings by various blocks, modules, components, circuits, steps, processes, algorithms, or the like (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented with a "processing system" that includes one or more processors. Examples of processors include microprocessors, microcontrollers, digital signal processors (DSPs), field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software modules, applications, software applications, software packages, routines, subroutines, objects, executables, threads of execution, procedures, functions, or the like, whether referred to as software, firmware, middleware, microcode, hardware description language, or otherwise.

Accordingly, in one or more example embodiments, the functions described may be implemented in hardware, software, firmware, or any combination thereof. If implemented in software, the functions may be stored on or encoded as one or more instructions or code on a computer-readable medium. Computer-readable media includes computer storage media. Storage media may be any available media that can be accessed by a computer. By way of example, and not limitation, such computer-readable media can include a random-access memory (RAM), a read-only memory (ROM), an electrically erasable programmable ROM (EEPROM), compact disk ROM (CD-ROM) or other optical disk storage, magnetic disk storage or other magnetic storage devices, combinations of the aforementioned types of computer-readable media, or any other medium that can be used to store computer executable code in the form of instructions or data structures that can be accessed by a computer.

It should be noted that while aspects may be described herein using terminology commonly associated with a 5G or NR radio access technology (RAT), aspects of the present disclosure can be applied to other RATs, such as a 3G RAT, a 4G RAT, and/or a RAT subsequent to 5G (e.g., 6G).

FIG. 1 is a diagram illustrating a wireless network 100 in which aspects of the present disclosure may be practiced. The wireless network 100 may be or may include elements of a 5G (NR) network and/or an LTE network, among other examples. The wireless network 100 may include a number of base stations 110 (shown as BS 110a, BS 110b, BS 110c, and BS 110d) and other network entities. A base station (BS) is an entity that communicates with user equipment (UEs) and may also be referred to as a 5G BS, a Node B, a gNB, a 5G NB, an access point, a transmit receive point (TRP), or the like. Each BS may provide communication coverage for a particular geographic area. In 3GPP, the term "cell" can refer to a coverage area of a BS and/or a BS subsystem serving this coverage area, depending on the context in which the term is used.

A BS may provide communication coverage for a macro cell, a pico cell, a femto cell, and/or another type of cell. A macro cell may cover a relatively large geographic area (e.g., several kilometers in radius) and may allow unrestricted access by UEs with service subscription. A pico cell may cover a relatively small geographic area and may allow unrestricted access by UEs with service subscription. A femto cell may cover a relatively small geographic area (e.g., a home) and may allow restricted access by UEs having association with the femto cell (e.g., UEs in a closed subscriber group (CSG)). A BS for a macro cell may be referred to as a macro BS. A BS for a pico cell may be referred to as a pico BS. A BS for a femto cell may be referred to as a femto BS or a home BS. In the example shown in FIG. 1, a BS 110a may be a macro BS for a macro cell 102a, a BS 110b may be a pico BS for a pico cell 102b, and a BS 110c may be a femto BS for a femto cell 102c. A BS may support one or multiple (e.g., three) cells. The terms "eNB", "base station", "5G BS", "gNB", "TRP", "AP", "node B", "5G NB", and "cell" may be used interchangeably herein.

In some examples, a cell may not necessarily be stationary, and the geographic area of the cell may move according to the location of a mobile BS. In some examples, the BSs may be interconnected to one another and/or to one or more other BSs or network nodes (not shown) in the wireless network 100 through various types of backhaul interfaces, such as a direct physical connection or a virtual network, using any suitable transport network.

Wireless network 100 may also include relay stations. A relay station is an entity that can receive a transmission of data from an upstream station (e.g., a BS or a UE) and send a transmission of the data to a downstream station (e.g., a UE or a BS). A relay station may also be a UE that can relay transmissions for other UEs. In the example shown in FIG. 1, a relay BS 110d may communicate with macro BS 110a and a UE 120d in order to facilitate communication between BS 110a and UE 120d. A relay BS may also be referred to as a relay station, a relay base station, a relay, or the like.

Wireless network 100 may be a heterogeneous network that includes BSs of different types, such as macro BSs, pico BSs, femto BSs, relay BSs, or the like. These different types of BSs may have different transmit power levels, different coverage areas, and different impacts on interference in wireless network 100. For example, macro BSs may have a high transmit power level (e.g., 5 to 40 watts) whereas pico BSs, femto BSs, and relay BSs may have lower transmit power levels (e.g., 0.1 to 2 watts).

A network controller 130 may couple to a set of BSs and may provide coordination and control for these BSs. Network controller 130 may communicate with the BSs via a backhaul. The BSs may also communicate with one another, e.g., directly or indirectly via a wireless or wireline backhaul.

UEs 120 (e.g., 120a, 120b, 120c) may be dispersed throughout wireless network 100, and each UE may be stationary or mobile. A UE may also be referred to as an access terminal, a terminal, a mobile station, a subscriber unit, a station, etc. A UE may be a cellular phone (e.g., a smart phone), a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, a medical device or equipment, biometric sensors/devices, wearable devices (smart watches, smart clothing, smart glasses, smart wrist bands, smart jewelry (e.g., smart ring, smart bracelet)), an entertainment device (e.g., a music or video device, or a satellite radio), a vehicular component or sensor, smart meters/sensors, industrial manufacturing equipment, a global positioning system device, or any other suitable device that is configured to communicate via a wireless or wired medium.

Some UEs may be considered machine-type communication (MTC) or evolved or enhanced machine-type communication (eMTC) UEs. MTC and eMTC UEs include, for example, robots, drones, remote devices, sensors, meters, monitors, location tags, etc., that may communicate with a base station, another device (e.g., remote device), or some other entity. A wireless node may provide, for example, connectivity for or to a network (e.g., a wide area network such as Internet or a cellular network) via a wired or wireless communication link. Some UEs may be considered Internet-of-Things (IoT) devices, and/or may be implemented as NB-IoT (narrowband internet of things) devices. Some UEs may be considered a Customer Premises Equipment (CPE). UE 120 may be included inside a housing that houses components of UE 120, such as processor components, memory components, or the like.

In general, any number of wireless networks may be deployed in a given geographic area. Each wireless network may support a particular RAT and may operate on one or more frequencies. A RAT may also be referred to as a radio technology, an air interface, or the like. A frequency may also be referred to as a carrier, a frequency channel, or the like. Each frequency may support a single RAT in a given geographic area in order to avoid interference between wireless networks of different RATs. In some cases, 5G RAT networks may be deployed.

In some aspects, two or more UEs 120 (e.g., shown as UE 120a and UE 120e) may communicate directly using one or more sidelink channels (e.g., without using a base station 110 as an intermediary to communicate with one another). For example, the UEs 120 may communicate using peer-to-peer (P2P) communications, device-to-device (D2D) communications, a vehicle-to-everything (V2X) protocol (e.g., which may include a vehicle-to-vehicle (V2V) protocol or a vehicle-to-infrastructure (V2I) protocol), and/or a mesh network. In this case, the UE 120 may perform scheduling operations, resource selection operations, and/or other operations described elsewhere herein as being performed by the base station 110.

Devices of wireless network 100 may communicate using the electromagnetic spectrum, which may be subdivided based on frequency or wavelength into various classes, bands, channels, or the like. For example, devices of wireless network 100 may communicate using an operating band having a first frequency range (FR1), which may span from 410 MHz to 7.125 GHz, and/or may communicate using an operating band having a second frequency range (FR2), which may span from 24.25 GHz to 52.6 GHz. The frequencies between FR1 and FR2 are sometimes referred to as mid-band frequencies. Although a portion of FR1 is greater than 6 GHz, FR1 is often referred to as a "sub-6 GHz" band. Similarly, FR2 is often referred to as a "millimeter wave" band despite being different from the extremely high frequency (EHF) band (30 GHz-300 GHz) which is identified by the International Telecommunications Union (ITU) as a "millimeter wave" band. Thus, unless specifically stated otherwise, it should be understood that the term "sub-6 GHz" or the like, if used herein, may broadly represent frequencies less than 6 GHz, frequencies within FR1, and/or mid-band frequencies (e.g., greater than 7.125 GHz). Similarly, unless specifically stated otherwise, it should be understood that the term "millimeter wave" or the like, if used herein, may broadly represent frequencies within the EHF band, frequencies within FR2, and/or mid-band frequencies (e.g., less than 24.25 GHz). It is contemplated that the frequencies included in FR1 and FR2 may be modified, and techniques described herein are applicable to those modified frequency ranges.

As indicated above, FIG. 1 is provided as an example. Other examples may differ from what is described with regard to FIG. 1.

Figure 2:
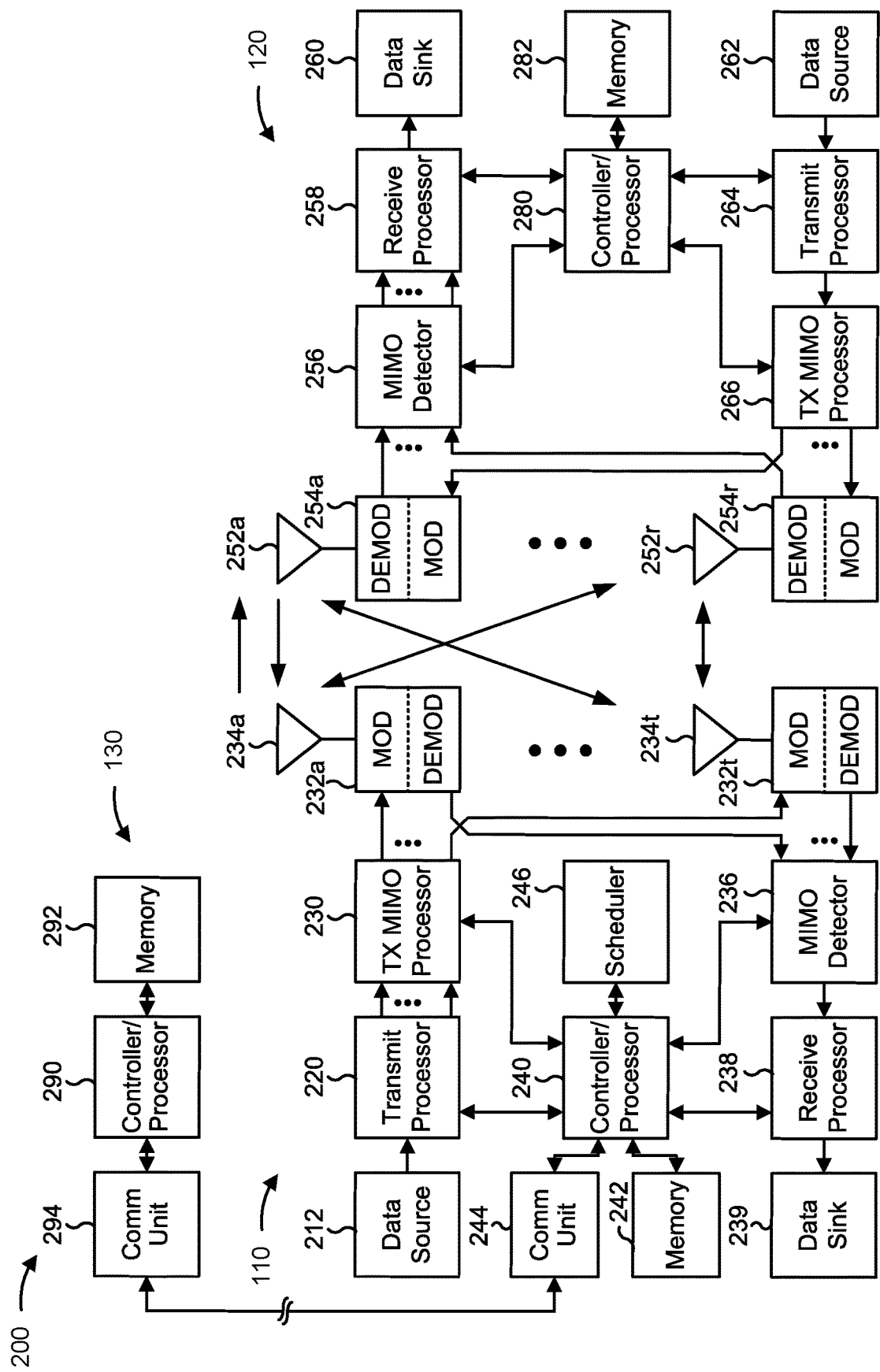
FIG. 2 is a diagram illustrating an example of a base station in communication with a UE in a wireless network.

FIG. 2 is a diagram illustrating an example 200 of a base station 110 in communication with a UE 120 in a wireless network 100. Base station 110 may be equipped with T antennas 234a through 234t, and UE 120 may be equipped with R antennas 252a through 252r, where in general T≥1 and R≥1.

At base station 110, a transmit processor 220 may receive data from a data source 212 for one or more UEs, may select a modulation and coding scheme (MCS) for each UE based at least in part on channel quality indicators (CQIs) received from the UE, process (e.g., encode and modulate) the data for each UE based at least in part on the MCS selected for the UE, and provide data symbols for all UEs. Transmit processor 220 may also process system information (e.g., for semi-static resource partitioning information (SRPI)) and control information (e.g., CQI requests, grants, and/or upper layer signaling) and provide overhead symbols and control symbols. Transmit processor 220 may also generate reference symbols for reference signals (e.g., a cell-specific reference signal (CRS), a phase tracking reference signal (PTRS), and/or a demodulation reference signal (DMRS)) and synchronization signals (e.g., a primary synchronization signal (PSS) or a secondary synchronization signal (SSS)). A transmit (TX) multiple-input multiple-output (MIMO) processor 230 may perform spatial processing (e.g., precoding) on the data symbols, the control symbols, the overhead symbols, and/or the reference symbols, if applicable, and may provide T output symbol streams to T modulators (MODs) 232a through 232t. Each modulator 232 may process a respective output symbol stream (e.g., for OFDM) to obtain an output sample stream. Each modulator 232 may further process (e.g., convert to analog, amplify, filter, and upconvert) the output sample stream to obtain a downlink signal. T downlink signals from modulators 232a through 232t may be transmitted via T antennas 234a through 234t, respectively.

At UE 120, antennas 252a through 252r may receive the downlink signals from base station 110 and/or other base stations and may provide received signals to demodulators (DEMODs) 254a through 254r, respectively. Each demodulator 254 may condition (e.g., filter, amplify, downconvert, and digitize) a received signal to obtain input samples. Each demodulator 254 may further process the input samples (e.g., for OFDM) to obtain received symbols. A MIMO detector 256 may obtain received symbols from all R demodulators 254a through 254r, perform MIMO detection on the received symbols if applicable, and provide detected symbols. A receive (RX) processor 258 may process (e.g., demodulate and decode) the detected symbols, provide decoded data for UE 120 to a data sink 260, and provide decoded control information and system information to a controller/processor 280. The term "controller/processor" may refer to one or more controllers, one or more processors, or a combination thereof. A channel processor may determine a reference signal received power (RSRP) parameter, a received signal strength indicator (RSSI) parameter, a reference signal received quality (RSRQ) parameter, and/or a CQI parameter, among other examples. In some aspects, one or more components of UE 120 may be included in a housing 284.

Network controller 130 may include communication unit 294, controller/processor 290, and memory 292. Network controller 130 may include, for example, one or more devices in a core network. Network controller 130 may communicate with base station 110 via communication unit 294.

Antennas (e.g., antennas 234a through 234t and/or antennas 252a through 252r) may include, or may be included within, one or more antenna panels, antenna groups, sets of antenna elements, and/or antenna arrays, among other examples. An antenna panel, an antenna group, a set of antenna elements, and/or an antenna array may include one or more antenna elements. An antenna panel, an antenna group, a set of antenna elements, and/or an antenna array may include a set of coplanar antenna elements and/or a set of non-coplanar antenna elements. An antenna panel, an antenna group, a set of antenna elements, and/or an antenna array may include antenna elements within a single housing and/or antenna elements within multiple housings. An antenna panel, an antenna group, a set of antenna elements, and/or an antenna array may include one or more antenna elements coupled to one or more transmission and/or reception components, such as one or more components of FIG. 2.

On the uplink, at UE 120, a transmit processor 264 may receive and process data from a data source 262 and control information (e.g., for reports that include RSRP, RSSI, RSRQ, and/or CQI) from controller/processor 280. Transmit processor 264 may also generate reference symbols for one or more reference signals. The symbols from transmit processor 264 may be precoded by a TX MIMO processor 266 if applicable, further processed by modulators 254a through 254r (e.g., for DFT-s-OFDM or CP-OFDM), and transmitted to base station 110. In some aspects, a modulator and a demodulator (e.g., MOD/DEMOD 254) of the UE 120 may be included in a modem of the UE 120. In some aspects, the UE 120 includes a transceiver. The transceiver may include any combination of antenna(s) 252, modulators and/or demodulators 254, MIMO detector 256, receive processor 258, transmit processor 264, and/or TX MIMO processor 266. The transceiver may be used by a processor (e.g., controller/processor 280) and memory 282 to perform aspects of any of the methods described herein.

At base station 110, the uplink signals from UE 120 and other UEs may be received by antennas 234, processed by demodulators 232, detected by a MIMO detector 236 if applicable, and further processed by a receive processor 238 to obtain decoded data and control information sent by UE 120. Receive processor 238 may provide the decoded data to a data sink 239 and the decoded control information to controller/processor 240. Base station 110 may include communication unit 244 and communicate to network controller 130 via communication unit 244. Base station 110 may include a scheduler 246 to schedule UEs 120 for downlink and/or uplink communications. In some aspects, a modulator and a demodulator (e.g., MOD/DEMOD 232) of the base station 110 may be included in a modem of the base station 110. In some aspects, the base station 110 includes a transceiver. The transceiver may include any combination of antenna(s) 234, modulators and/or demodulators 232, MIMO detector 236, receive processor 238, transmit processor 220, and/or TX MIMO processor 230. The transceiver may be used by a processor (e.g., controller/processor 240) and memory 242 to perform aspects of any of the methods described herein. A scheduler 246 may schedule UEs for data transmission on the downlink and/or uplink.

Controller/processor 240 of base station 110, controller/processor 280 of UE 120, and/or any other component(s) of FIG. 2 may perform one or more techniques associated with, as described in more detail elsewhere herein. For example, controller/processor 240 of base station 110, controller/processor 280 of UE 120, and/or any other component(s) of FIG. 2 may perform or direct operations of, for example, method 800 of FIG. 8, method 900 of FIG. 9, and/or other processes as described herein. Memories 242 and 282 may store data and program codes for BS 110 and UE 120, respectively. In some aspects, memory 242 and/or memory 282 may include a non-transitory computer-readable medium storing one or more instructions (e.g., code and/or program code) for wireless communication. For example, the one or more instructions, when executed (e.g., directly, or after compiling, converting, and/or interpreting) by one or more processors of the base station 110 and/or the UE 120, may cause the one or more processors, the UE 120, and/or the base station 110 to perform or direct operations of, for example, method 800 of FIG. 8, method 900 of FIG. 9, and/or other processes as described herein. In some aspects, executing instructions may include running the instructions, converting the instructions, compiling the instructions, and/or interpreting the instructions, among other examples.

As indicated above, FIG. 2 is provided as an example. Other examples may differ from what is described with regard to FIG. 2.

Figure 3:
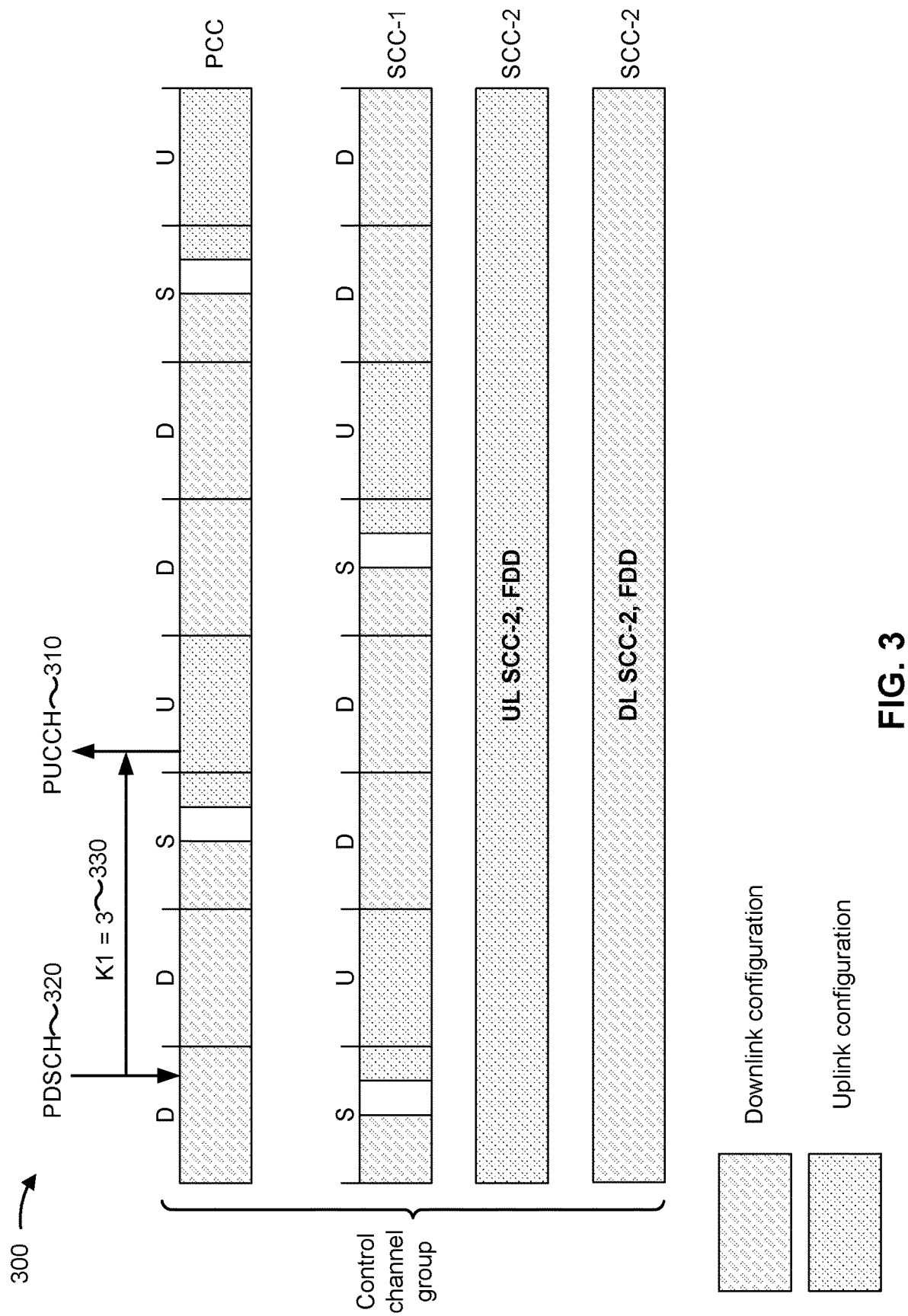
FIG. 3 is a diagram illustrating an example of a carrier aggregation configuration.

FIG. 3 is a diagram illustrating an example 300 of carrier aggregation (CA). Example 300 includes a primary component carrier (PCC) and a set of secondary component carriers (SCCs): SCC-1 and SCC-2. A PCC is a carrier (e.g., a serving cell) that handles radio resource control (RRC) configuration of a UE, communications relating to establishing, modifying, or releasing an SCC, and/or the like. An SCC is a carrier (e.g., a serving cell) that handles data communications of the UE, such as user data communications. Generally, a PCC may be changed on handover of the UE, whereas an SCC can be reconfigured via the PCC. The UE may be associated with multiple SCCs, such as up to four SCCs in some deployments, though other numbers of SCCs may be used. In example 300, the PCC, SCC-1, and SCC-2 are included in a control channel group such as a PUCCH group. As used herein, a PUCCH group is a group of CCs on which a PUCCH associated with a downlink shared channel (e.g., a physical downlink shared channel (PDSCH)) received on one CC of the group of CCs can be provided. For example, if a PDSCH is received on the PCC, the SCC-1, or the SCC-2, a corresponding PUCCH can be provided on any one of the PCC, the SCC-1, or the SCC-2 in a determined slot, as described in more detail elsewhere herein. In some aspects, a control channel group may be a cell group, such as a master cell group (MCG) or a secondary cell group (SCG). For example, as described above, a group (e.g., a control channel group, a cell group, or the like) may be a group of CCs on which a control channel (e.g., a PUCCH) associated with a downlink channel (e.g., a downlink shared channel) received on one CC of the group of CCs can be provided.

The PCC and SCC-1 of example 300 are subdivided into slots in the time domain. As shown, in example 300 (and many other examples described herein), diagonal fill indicates a downlink configuration (e.g., a slot of a CC or a frequency region of a CC that can be used for downlink communication) and dotted fill indicates an uplink configuration (e.g., a slot of a CC or a frequency region of a CC that can be used for uplink communication). The PCC and SCC-1 may be subdivided into slots based at least in part on the PCC and the SCC-1 being associated with a TDD configuration. In a TDD configuration, slots are indicated as downlink slots (marked by a diagonal fill and a "D"), uplink slots (marked by a dotted fill and a "U"), or special slots (marked by an "S"). A special slot can include downlink resources and uplink resources, and can include a switching gap (indicated by a white fill) to switch between a downlink configuration and an uplink configuration. As shown in FIG. 3, the PCC and the SCC-1 are configured such that each slot includes an uplink resource on at least one of the PCC or the SCC-1. The SCC-2 of example 300 is an FDD CC. An FDD CC is a CC that has separate frequency regions for uplink transmission and downlink reception. For example, an FDD CC may include an uplink (UL) region and a downlink (DL) region, as shown in FIG. 3. Aspects of the present disclosure can be implemented in a CA configuration with only FDD CCs, only TDD CCs, or a combination of FDD CCs and TDD CCs. The FDD CC may be subdivided into slots of a slot length based at least in part on a subcarrier spacing of the FDD CC. The slot subdivisions of the FDD CC are not shown in FIG. 3.

A UE may transmit a PUCCH 310 carrying feedback regarding a PDSCH 320. For example, the PUCCH 310 may carry hybrid automatic repeat request (HARD) feedback regarding reception of the PDSCH 320. The UE may transmit the PUCCH 310 on a slot indicated by a slot offset 330. In FIG. 3, the slot offset 330 is denoted by K1, and has a value of 3. The value of 3 indicates a number of slots that the UE is to count, starting with a slot after the slot in which the PDSCH 320 is indicated as "1," and arriving at the slot in which the PUCCH 310 is transmitted as "3." The slot offset may be indicated in downlink control information (DCI) scheduling the PDSCH 320, such as in a field "PDSCH-to-HARQ feedback timing indicator."

When the PUCCH 310 is transmitted on the same CC on which the PDSCH 320 is received, then the counting is straightforward. However, if the PUCCH 310 is to be transmitted on the SCC-1 or the UL region of the SCC-2, and if the SCC-1 is associated with a different slot length than the PCC, then it may be difficult to identify which slot is to be used for transmission of the PUCCH 310. For example, if the SCC-1 were associated with shorter slots than the PCC and the PUCCH 310 is to be transmitted on the SCC-1, then it may be unclear whether to count 3 slots on the PCC (thereby causing the PUCCH 310 to be transmitted on a slot greater than 3 slots after the PDSCH 320 on the SCC-1) or on the SCC-1 (thereby causing the PUCCH 310 to be transmitted on a slot less than 3 slots after the PDSCH 320 on the PCC). Techniques and apparatuses described herein provide determination of a slot on a selected CC for transmission of an uplink control channel based at least in part on a slot offset (e.g., K1) and a reference slot on a CC selected from the PUCCH group. Thus, ambiguity in which slot should be used to transmit the PUCCH 310 is resolved.

As indicated above, FIG. 3 is provided as an example. Other examples may differ from what is described with regard to FIG. 3.

Figure 4:
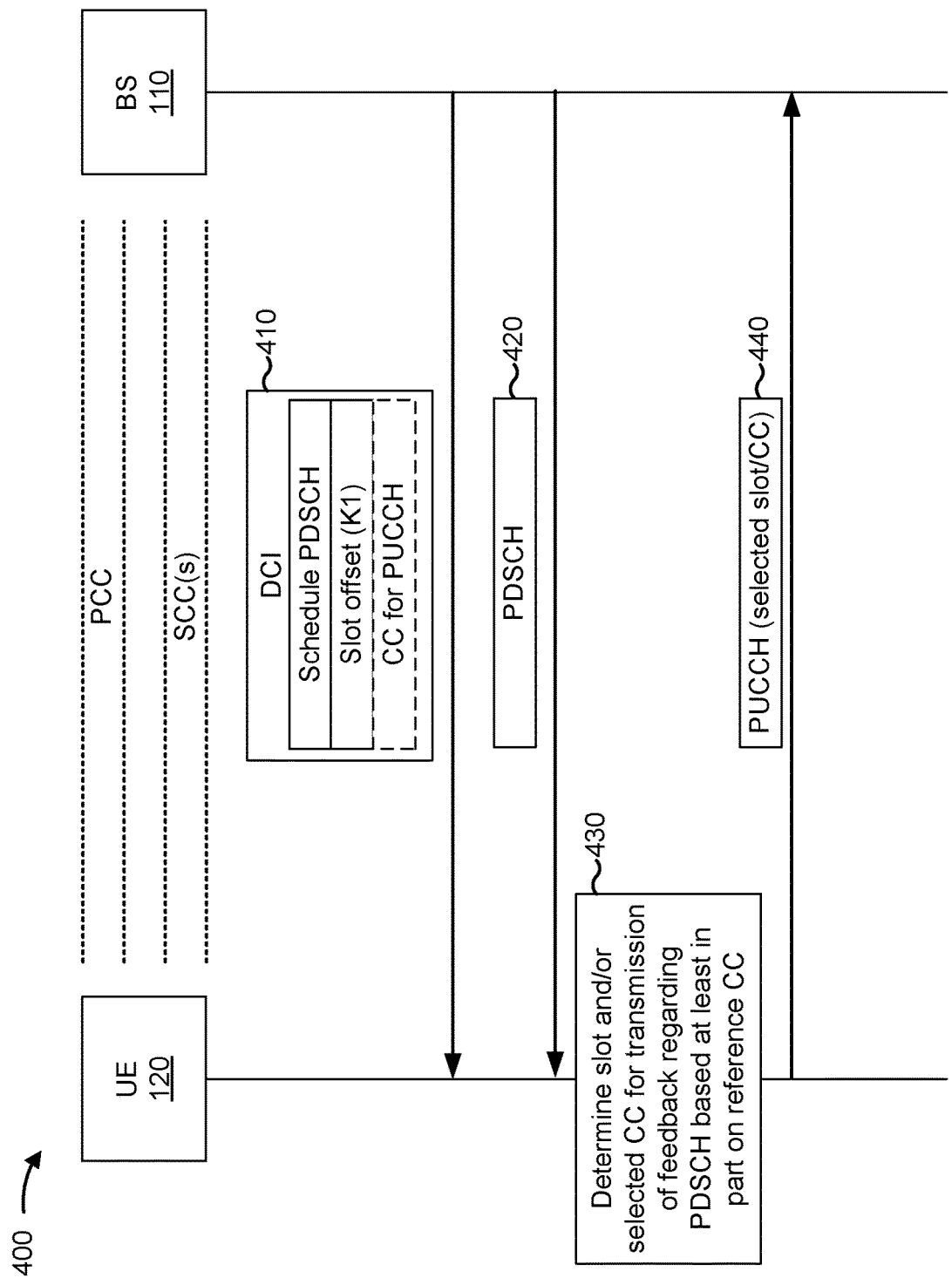
FIG. 4 is a diagram illustrating an example of signaling associated with determination of a slot for transmission of a PUCCH based at least in part on a reference CC.

FIG. 4 is a diagram illustrating an example 400 of signaling associated with determination of a slot for transmission of a PUCCH based at least in part on a reference CC. As shown, example 400 includes a UE 120 and a BS 110. As shown, the UE 120 and the BS 110 may be associated with a CA configuration, which may include a PCC and one or more SCCs. The PCC can be a TDD PCC or an FDD PCC. The one or more SCCs can include one or more TDD CCs, one or more FDD CCs, or a combination thereof.

At 410, the BS 110 may transmit DCI to the UE 120. As shown, the DCI may schedule a PDSCH. The PDSCH may be scheduled on the PCC or on an SCC of the one or more SCCs. As further shown, the DCI may indicate a slot offset (e.g., K1). The slot offset may indicate a number of slots to be counted from a slot in which the PDSCH is received to a slot for transmission of a corresponding PUCCH. As described in more detail below, the slot offset may be used with regard to a reference CC to determine the slot for transmission of the corresponding PUCCH.

In some aspects, as indicated by the box with the dashed border, the DCI may optionally indicate a selected CC on which the UE 120 is to transmit the PUCCH corresponding to the PDSCH. For example, the DCI may indicate a CC index, a bitmap that identifies the CC, and/or the like. In this case, the selected CC (on which the PUCCH is to be transmitted) may be a reference CC for determination of a slot in which to transmit the PUCCH, as described in more detail below.

At 420, the BS 110 may transmit the PDSCH. For example, the BS 110 may transmit the PDSCH on a resource indicated by the DCI. In some aspects, the PDSCH may be transmitted on the PCC. In some aspects, the PDSCH may be transmitted on an SCC of the one or more SCCs.

Figure 5:
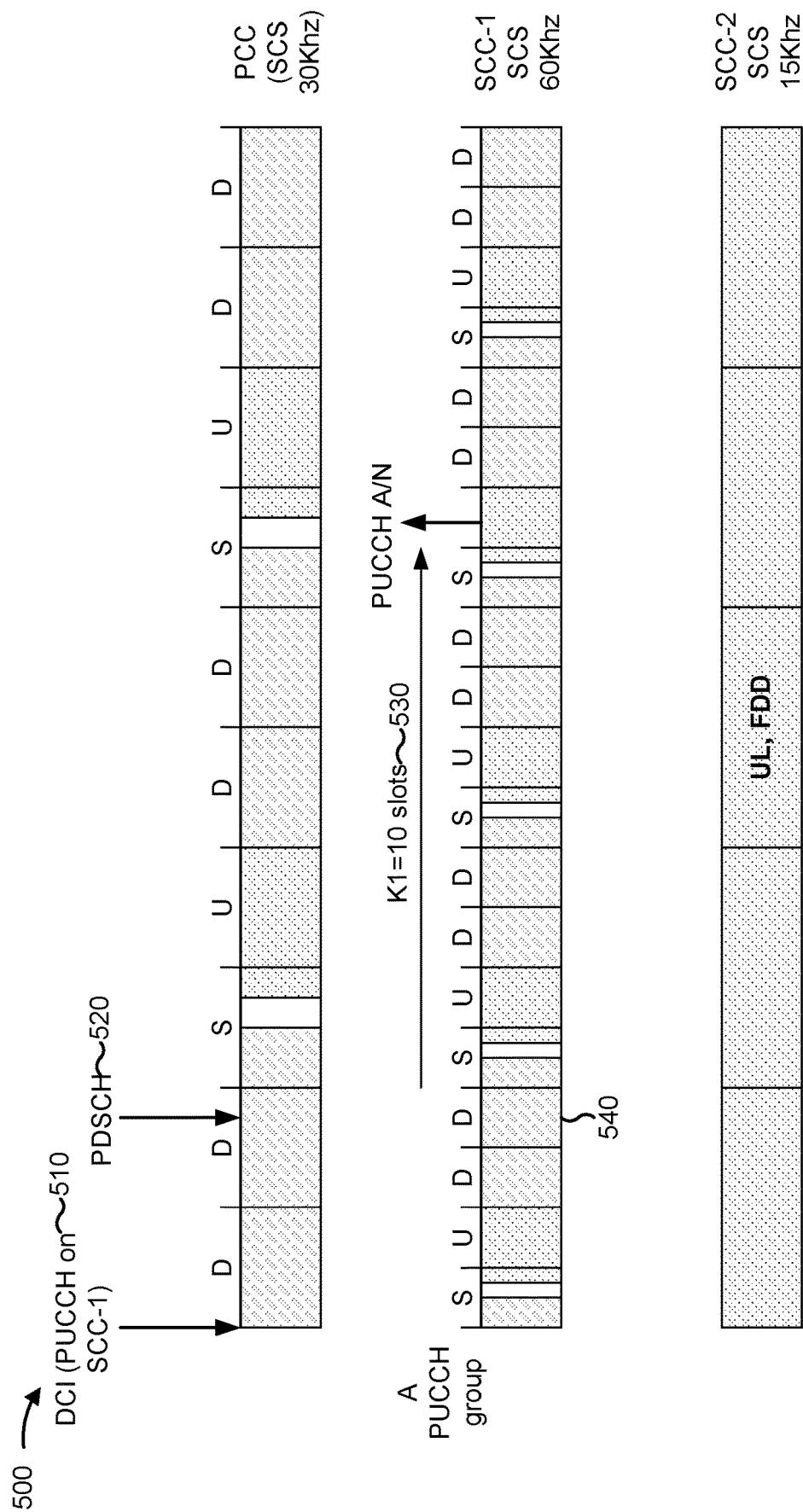
FIG. 5 is a diagram illustrating an example of determination of a slot for transmission of feedback when the DCI indicates the CC on which to transmit the PUCCH.
Figure 6:
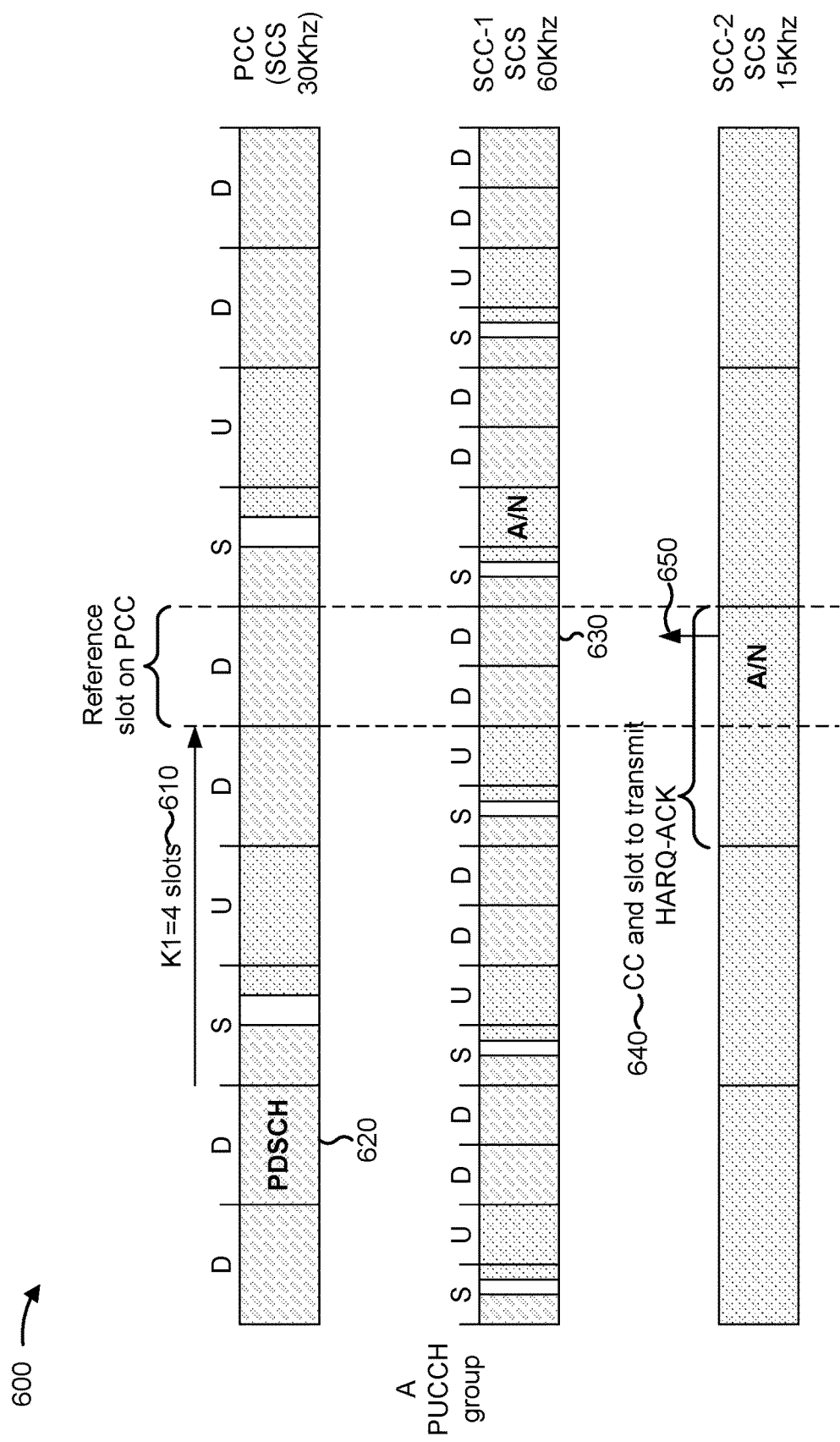
FIG. 6 is a diagram illustrating an example of determination of a slot for transmission of feedback based at least in part on a primary CC being a reference CC.
Figure 7:
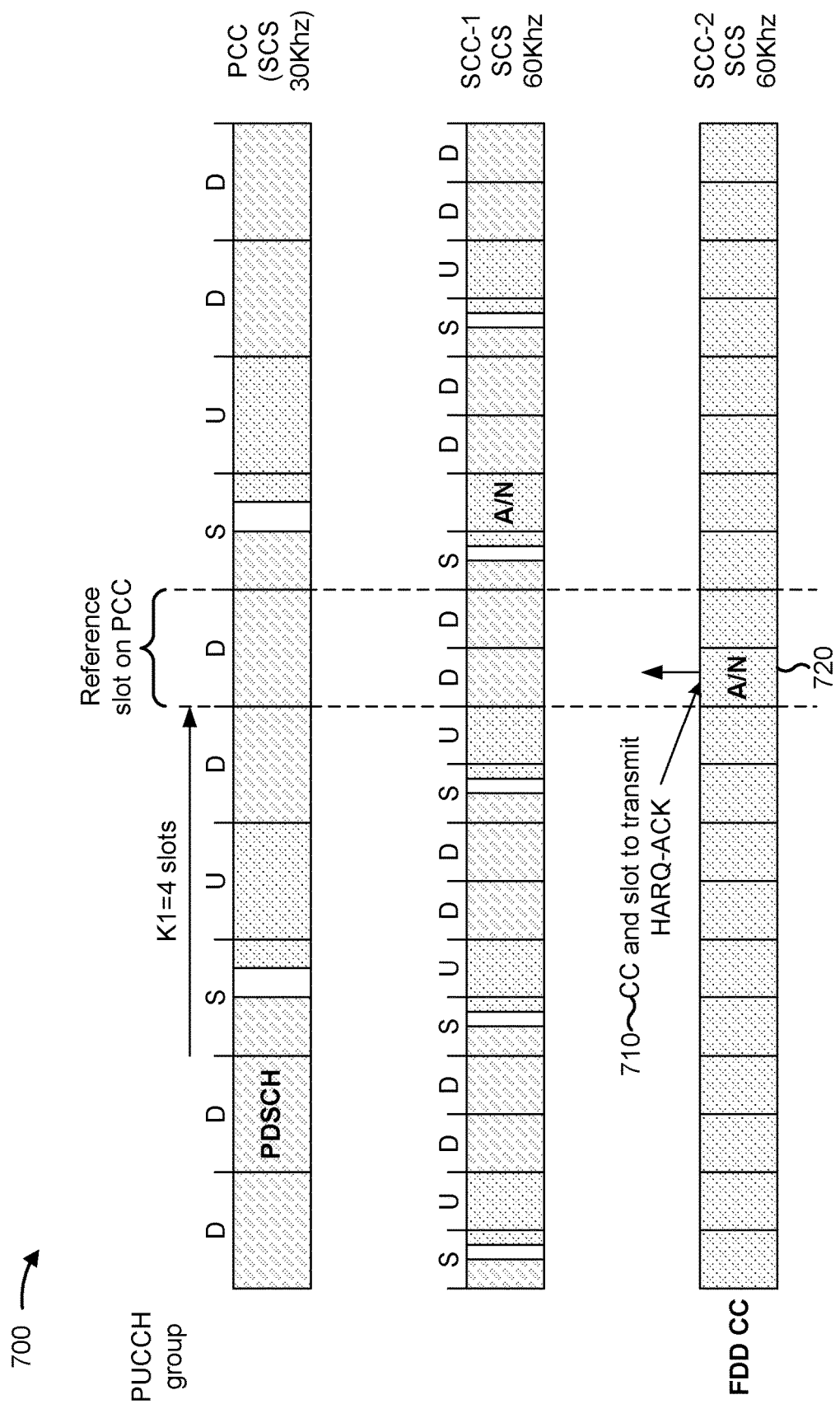
FIG. 7 shows an example of determination of a slot for transmission of a PUCCH based at least in part on a primary CC being a reference CC.

At 430, the UE 120 may determine a slot and/or a selected CC for transmission of feedback regarding the PDSCH. For example, the UE 120 may determine the slot based at least in part on the slot offset indicated by the DCI and based at least in part on a reference slot on a reference CC. In some aspects, the UE 120 may determine the selected CC based at least in part on the DCI. In some aspects, the UE 120 may determine the selected CC based at least in part on a rule. In some aspects, the UE 120 may determine the slot based at least in part on counting a number of slots on the reference CC and identifying the slot based at least in part on a reference slot on the reference CC. For example, the identified slot may be the reference slot, or may be on a different CC and may at least partially overlap the reference slot in time. FIGS. 5-7 provide examples of determination of a slot for transmission of feedback based at least in part on a reference CC.

FIG. 5 is a diagram illustrating an example 500 of determination of a slot for transmission of feedback when the DCI indicates the selected CC on which to transmit the PUCCH. As shown, example 500 includes a PCC with a subcarrier spacing (SCS) of 30 kHz. An SCS indicates a frequency width of subcarriers of a CC. The slot length of a CC is proportionate to the SCS of the CC. For example, a CC with an SCS of 30 kHz may have a slot length that is twice as long as a CC with an SCS of 60 kHz, and half as long as a CC with an SCS of 15 kHz. As further shown, example 500 includes a first SCC (SCC-1, which is a TDD SCC) with an SCS of 60 kHz and a second SCC (SCC-2, which is an FDD SCC) with an SCS of 15 kHz. Furthermore, in example 500, the slot offset K1 is 10 slots. It can be seen that inconsistency would arise if the slot for transmission of the PUCCH were determined with regard to the PCC versus the SCC-1 or the SCC-2.

Example 500 is an example where a reference CC is indicated by DCI, and is a same CC on which the PUCCH is to be transmitted. In other aspects described herein (e.g., examples 600 and 700 of FIGS. 6 and 7), the reference CC is the PCC and/or the CC on which the PDSCH is received.

At 510, the UE 120 may receive DCI (e.g., DCI 410 of FIG. 4) indicating that the PUCCH is to be transmitted on SCC-1. Thus, in example 500, SCC-1 is a reference CC for determination of the slot in which to transmit the PUCCH. At 520, the UE 120 may receive the PDSCH in a slot on the PCC. At 530, the UE 120 may count ten slots on SCC-1 to identify a slot for transmission of the PUCCH, and may transmit the PUCCH in the identified slot on SCC-1. For example, the UE 120 may start counting at a next slot on SCC-1 after a slot 540 on SCC-1 that includes a time at which the PDSCH is received. As further shown, the PUCCH may carry acknowledgment (ACK)/negative ACK (NACK) information regarding the PDSCH, such as HARQ-ACK information. Thus, the UE 120 may determine the slot for transmission of the PUCCH at a granularity of the CC where the HARQ-ACK information is transmitted.

FIG. 6 is a diagram illustrating an example 600 of determination of a slot for transmission of feedback based at least in part on a primary CC being a reference CC, as specified in a 3GPP standard. As shown, the CA configuration in example 600 includes a PCC with a 30 kHz SCS, an SCC-1 with a 60 kHz SCS, and an SCC-2 with a 15 kHz SCS. As further shown, in example 600, the slot offset K1 is 4 slots.

In example 600, DCI scheduling the PDSCH may not indicate a selected CC on which to transmit the PUCCH. For example, in example 600, the UE 120 may determine which CC is to be used for transmission of the PUCCH. As shown by reference number 610, the UE 120 may use a PCC as the reference CC for determination of a slot in which to transmit the PUCCH. For example, the UE 120 may count four slots from a slot 620 in which the PDSCH is received, and may thus identify a reference slot.

The UE 120 may determine a CC for transmission of the PUCCH based at least in part on a condition. For example, the UE 120 may identify a selected CC, of a PUCCH group that includes the PCC, with a slot that overlaps the reference slot on the PCC, where the slot has sufficient uplink resources (e.g., a sufficient number of uplink orthogonal frequency division multiplexing (OFDM) symbols to accommodate the PUCCH). In example 600, the UE 120 may identify the SCC-2, since the SCC-1 of example 600 does not have uplink resources at the time of the reference slot (shown by reference number 630) and the SCC-2 has sufficient uplink resources at the time of the reference slot (shown by reference number 640). At 650, the UE 120 may transmit the PUCCH in the identified slot on the SCC-2.

In some aspects, the UE 120 may determine whether the CCs have sufficient resources for the PUCCH based at least in part on an order. In some aspects, the order may correspond to indexes of the CCs (e.g., a PCC first, then SCCs in order of SCC indexes of the SCCs). In some aspects, a BS 110 may configure the order. In some aspects, the UE 120 may transmit the PUCCH on a first CC (according to the order) that satisfies a condition, such as the condition described above.

In example 600, the PCC is the reference CC. This may be referred to as a static PUCCH carrier indication rule. In some aspects, the PCC is defined as the reference CC. For example, the UE 120 may use the PCC as the reference CC irrespective of which CC carries the PDSCH. In some aspects, a CC on which the PDSCH is received is the reference CC. For example, if the UE 120 receives the PDSCH on SCC-1, the UE 120 may use the SCC-1 as the reference CC. In some aspects, such as described in connection with FIGS. 3 and 4, the reference CC is indicated by DCI scheduling the PDSCH, which may be referred to as a dynamic PUCCH carrier indication rule. In some aspects, the reference CC is configured, such as via RRC signaling.

FIG. 7 shows an example 700 of determination of a slot for transmission of a PUCCH based at least in part on a primary CC being a reference CC. As shown in example 700, the UE 120 may identify a reference slot on the PCC based at least in part on a slot offset. Furthermore, the UE 120 may select the SCC-2 for transmission of the PUCCH based at least in part on the PCC and the SCC-1 not including sufficient uplink resources in the reference slot, as described elsewhere herein. At 710, the UE 120 may identify a slot on the SCC-2 in which to transmit the PUCCH. As further shown, multiple slots on the SCC-2 overlap the reference slot on the PCC. In such a case, the UE 120 may select the slot in which to transmit the PUCCH based at least in part on a rule. At 720, the UE 120 may select an earliest slot that overlaps the reference slot on the SCC-2. As further shown, the UE 120 may transmit the PUCCH on the selected slot on the SCC-2.

In some aspects, the rule may indicate that an earliest slot that overlaps the reference slot in time is to be selected for transmission of the PUCCH. In some aspects, the rule may indicate that an earliest slot that is included in the reference slot in time is to be selected for transmission of the PUCCH. In some aspects, the rule may indicate that a latest slot that overlaps the reference slot in time is to be selected for transmission of the PUCCH. In some aspects, the rule may indicate that a latest slot that is included in the reference slot in time is to be selected for transmission of the PUCCH. In some aspects, the rule may indicate that any slot that overlaps the reference slot in time is to be selected for transmission of the PUCCH. In some aspects, the rule may indicate that any slot that is included in the reference slot in time is to be selected for transmission of the PUCCH. In some aspects, the rule may indicate that the slot for transmission of the PUCCH is to be selected based at least in part on a parameter, such as a number of available resources in a slot (e.g., a slot that overlaps the reference slot that has the most available resources).

Returning to FIG. 4, at 440, the UE 120 may transmit the PUCCH on the selected slot and the selected CC. For example, the UE 120 may select the slot and selected CC from the PUCCH group for transmission of the PUCCH, and may transmit the PUCCH on the selected slot. Thus, the UE 120 may select a CC from a PUCCH group, and may transmit a PUCCH on the CC based at least in part on a reference slot on a reference CC, which reduces delay and improves resource utilization relative to transmitting the PUCCH on the PCC as a matter of course.

As indicated above, FIGS. 4-7 are provided as one or more examples. Other examples may differ from what is described with regard to FIGS. 4-7.

Figure 8:
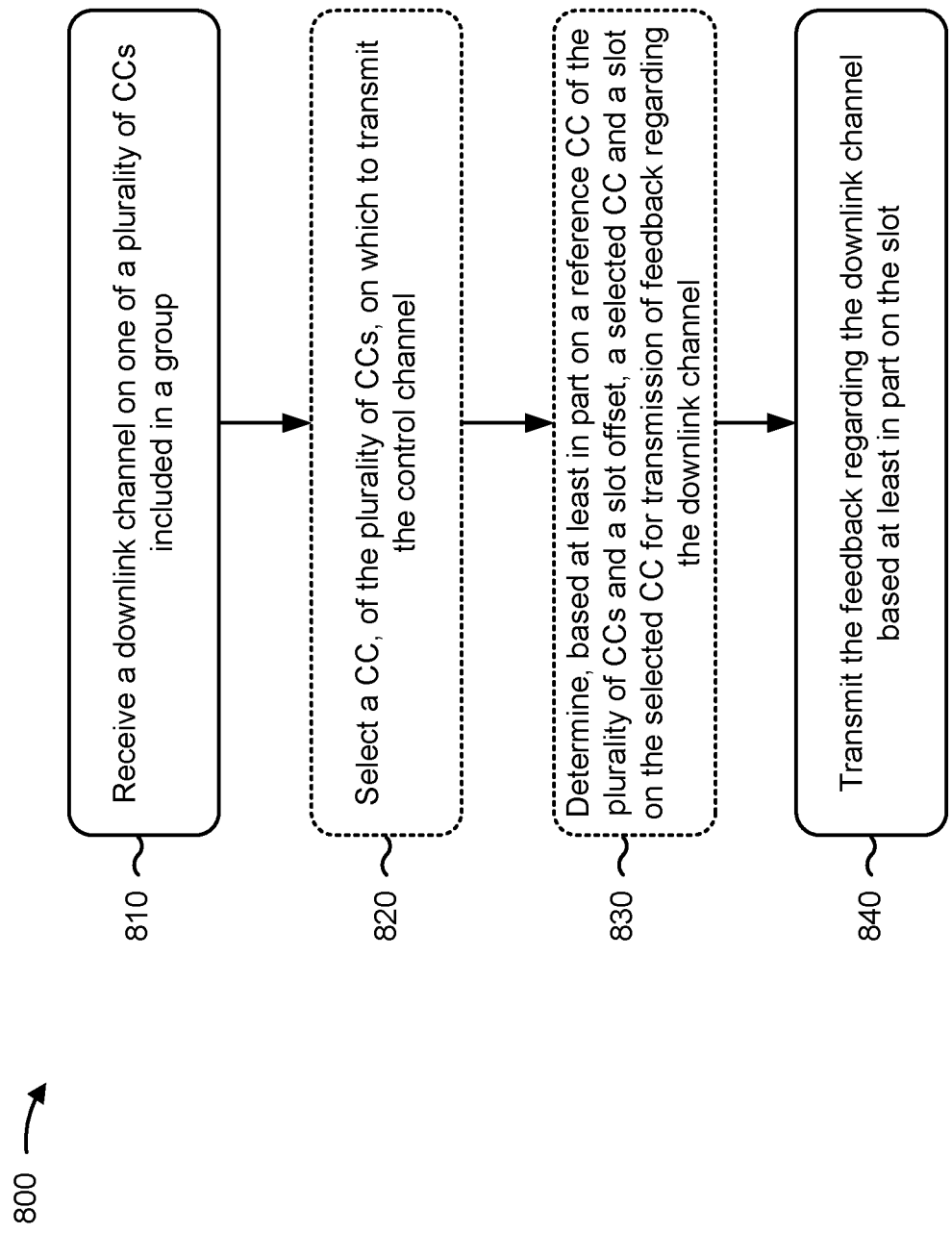
FIGS. 8-9 are flowcharts of example methods of wireless communication.

FIG. 8 is a diagram illustrating an example method 800 performed, for example, by a UE, in accordance with the present disclosure. Example method 800 is an example where the UE (e.g., UE 120) performs operations associated with slot indication for uplink control channel carrier switch.

At 810, the UE may receive a downlink channel on one of a plurality of CCs included in a group. For example, the UE (e.g., using reception component 1002, depicted in FIG. 10) may receive a downlink channel on one of a plurality of CCs included in a group, as described above. The group may be a PUCCH group, as described above. The downlink channel may be the PDSCH described with regard to FIGS. 3-7. The plurality of CCs may be a plurality of cells of a PUCCH group, a plurality of cells of an MCG, or a plurality of cells of an SCG.

At 820, the UE may optionally select a CC, of the plurality of CCs, on which to transmit the control channel. For example, the UE (e.g., using selection component 1010, depicted in FIG. 10) may select the CC based at least in part on an order associated with the plurality of CCs. In some aspects, the order may prioritize a primary CC of the plurality of CCs, then one or more secondary CCs of the plurality of CCs. In some aspects, the order is configured via radio resource control or medium access control signaling. For example, the BS may configure an order via radio resource control signaling, and may indicate a selected order. In some aspects, the slot is on a primary CC of the plurality of CCs, and the feedback is transmitted in a slot, on the reference CC, that at least partially overlaps the slot on the primary CC in time. In some aspects, multiple slots overlap the slot on the primary CC in time, and the feedback is transmitted in an earliest slot of the multiple slots. The control channel may be the PUCCH described with regard to FIGS. 3-7.

At 830, the UE may optionally determine, based at least in part on a reference CC of the plurality of CCs and a slot offset, a selected CC and a slot on the selected CC for transmission of feedback regarding the downlink channel. For example, the UE (e.g., using determination component 1008, depicted in FIG. 10) may determine, based at least in part on a reference CC of the plurality of CCs and a slot offset, a selected CC and a slot on the selected CC for transmission of feedback regarding the downlink channel, as described above. In some aspects, the UE may determine the slot based at least in part on a number of slots indicated by the slot offset, wherein the number of slots is counted in accordance with a slot length of the reference CC. The feedback may include HARQ-ACK information. In some aspects, the feedback may be transmitted via the control channel.

At 840, the UE may transmit the feedback regarding the downlink channel based at least in part on the slot. For example, the UE (e.g., using transmission component 1004, depicted in FIG. 10) may transmit the feedback regarding the downlink channel in the slot, as described above. The slot may be based at least in part on a reference CC, of the plurality of CCs, and a slot offset. For example, the reference CC may be indicated by control information scheduling the downlink channel (such as a target CC for the feedback) or may be configured, such as by RRC signaling, as described elsewhere herein. The feedback may be transmitted via the control channel. For example, the feedback may be HARQ feedback regarding reception of the downlink channel and may be transmitted via a PUCCH.

Method 800 may include additional aspects, such as any single aspect or any combination of aspects described below and/or in connection with one or more other processes described elsewhere herein.

In a first aspect, determining the selected CC and a slot on the selected CC for transmission of feedback regarding the downlink channel further comprises determining the slot based at least in part on a number of slots indicated by the slot offset, wherein the number of slots is counted in accordance with a slot length of the reference CC.

In a second aspect, alone or in combination with the first aspect, the number of slots is counted based at least in part on the slot and a slot in which the downlink channel is received.

In a third aspect, alone or in combination with one or more of the first and second aspects, the downlink channel is scheduled by control information that indicates the reference CC.

In a fourth aspect, alone or in combination with one or more of the first through third aspects, the control information indicates the slot offset.

In a fifth aspect, alone or in combination with one or more of the first through fourth aspects, the feedback is transmitted on the reference CC.

In a sixth aspect, alone or in combination with one or more of the first through fifth aspects, the reference CC is a primary CC of the group, and determining the selected CC and the slot on the selected CC to transmit the feedback is based at least in part on a number of slots indicated by the slot offset and counted in accordance with a slot length of the reference CC.

In a seventh aspect, alone or in combination with one or more of the first through sixth aspects, method 800 includes selecting a CC, of the plurality of CCs, on which to transmit the control channel.

In an eighth aspect, alone or in combination with one or more of the first through seventh aspects, the selected CC is a different CC than the reference CC.

In a ninth aspect, alone or in combination with one or more of the first through eighth aspects, selecting the CC is based at least in part on an order associated with the plurality of CCs.

In a tenth aspect, alone or in combination with one or more of the first through ninth aspects, the order prioritizes a primary CC of the plurality of CCs, then one or more secondary CCs of the plurality of CCs.

In an eleventh aspect, alone or in combination with one or more of the first through tenth aspects, the order is configured via radio resource control or medium access control signaling.

In a twelfth aspect, alone or in combination with one or more of the first through eleventh aspects, the slot on the selected CC at least partially overlaps a reference slot, on the reference CC, that is determined based at least in part on the slot offset.

In a thirteenth aspect, alone or in combination with one or more of the first through twelfth aspects, multiple slots overlap the reference slot on the reference CC in time, and the slot on the selected CC is an earliest slot of the multiple slots.

In a fourteenth aspect, alone or in combination with one or more of the first through thirteenth aspects, method 800 includes receiving configuration indicating which CC, of the plurality of CCs, is the reference CC Although FIG. 8 shows example blocks of method 800, in some aspects, method 800 may include additional blocks, fewer blocks, different blocks, or differently arranged blocks than those depicted in FIG. 8. Additionally, or alternatively, two or more of the blocks of method 800 may be performed in parallel.

Figure 9:
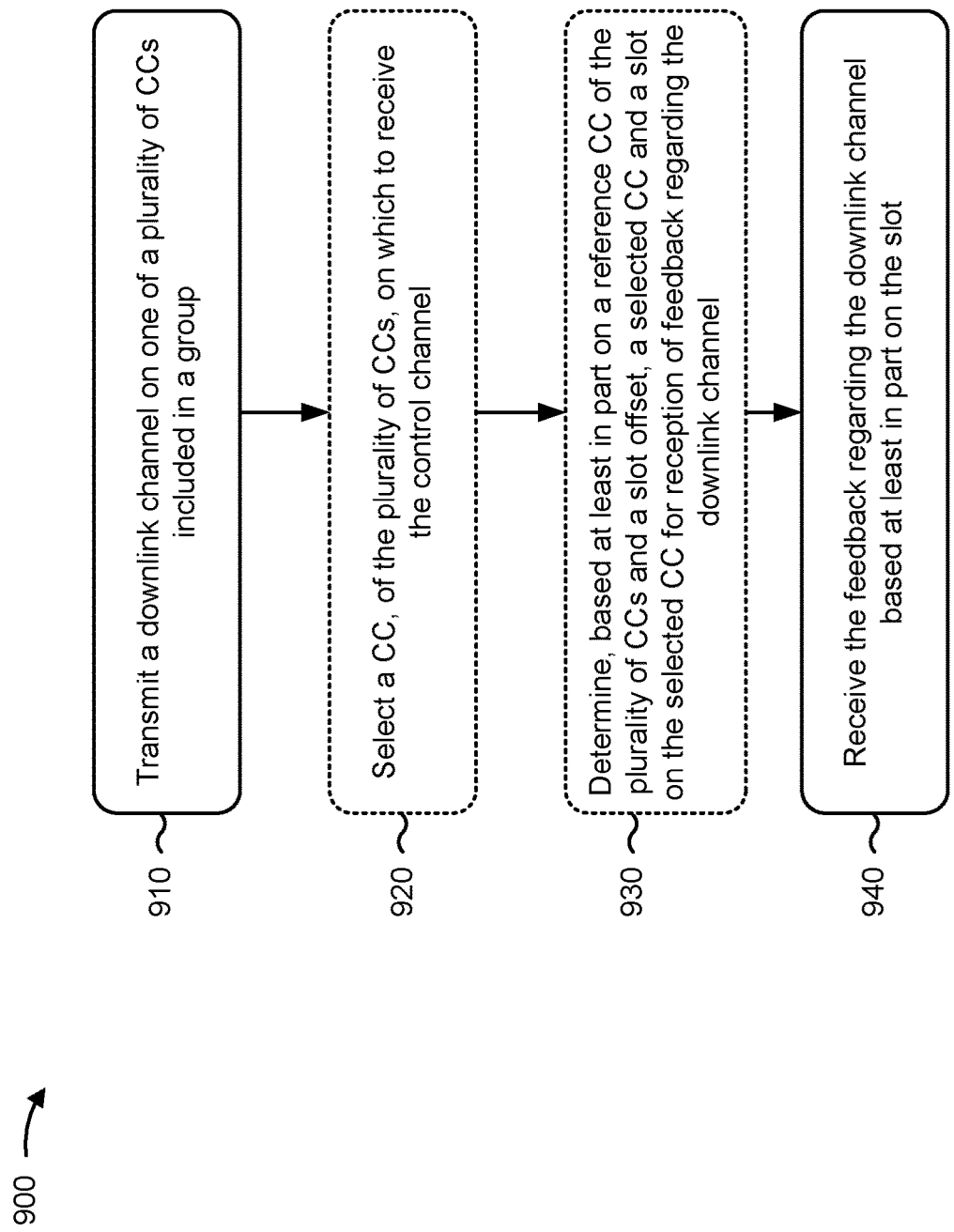

FIG. 9 is a diagram illustrating an example method 900 performed, for example, by a base station, in accordance with the present disclosure. Example method 900 is an example where the base station (e.g., base station 110) performs operations associated with slot indication for uplink control channel carrier switch.

At 910, the base station may transmit a downlink channel on one of a plurality of CCs included in a group (block 910). For example, the base station (e.g., using transmission component 1204, depicted in FIG. 12) may transmit a downlink channel on one of a plurality of CCs included in a group, as described above. The downlink channel may include the PDSCH described with regard to FIGS. 3-7.

At 920, the base station may optionally select a CC, of the plurality of CCs, for transmission of the control channel. For example, the base station (e.g., using selection component 1210 of FIG. 12) may optionally select a CC, of the plurality of CCs, for transmission of the control channel. The control channel may include the PUCCH described with regard to FIGS. 3-7.

At 930, the base station may optionally determine, based at least in part on a reference CC of the plurality of CCs and a slot offset, a selected CC and a slot on the selected CC for reception of feedback regarding the downlink channel. For example, the base station (e.g., using determination component 1208, depicted in FIG. 12) may determine, based at least in part on a reference CC of the plurality of CCs and a slot offset, a selected CC and a slot on the selected CC for reception of feedback regarding the downlink channel, as described above. The feedback may be transmitted via the control channel.

At 940, the base station may receive the feedback regarding the downlink channel based at least in part on the slot. For example, the base station (e.g., using reception component 1202, depicted in FIG. 12) may receive the feedback regarding the downlink channel in a slot, as described above. The slot may be on a selected CC of the plurality of CCs. The slot may be based at least in part on a reference CC and a slot offset, as described elsewhere herein.

Method 900 may include additional aspects, such as any single aspect or any combination of aspects described below and/or in connection with one or more other processes described elsewhere herein.

In a first aspect, determining the selected CC and the slot on the selected CC for reception of feedback regarding the downlink channel further comprises determining the slot based at least in part on a number of slots indicated by the slot offset, wherein the number of slots is counted in accordance with a slot length of the reference CC.

In a second aspect, alone or in combination with the first aspect, the number of slots is counted based at least in part on the slot and a slot in which the downlink channel is transmitted.

In a third aspect, alone or in combination with one or more of the first and second aspects, method 900 includes transmitting control information indicating the reference CC.

In a fourth aspect, alone or in combination with one or more of the first through third aspects, the control information indicates the slot offset.

In a fifth aspect, alone or in combination with one or more of the first through fourth aspects, the feedback is received on the reference CC.

In a sixth aspect, alone or in combination with one or more of the first through fifth aspects, the reference CC is a primary CC of the group, and determining the selected CC and the slot on the selected CC to transmit the control channel is based at least in part on a number of slots indicated by the slot offset and counted in accordance with a slot length of the reference CC.

In a seventh aspect, alone or in combination with one or more of the first through sixth aspects, method 900 includes selecting a CC, of the plurality of CCs, for transmission of the control channel.

In an eighth aspect, alone or in combination with one or more of the first through seventh aspects, the selected CC is a different CC than the reference CC.

In a ninth aspect, alone or in combination with one or more of the first through eighth aspects, selecting the CC is based at least in part on an order associated with the plurality of CCs.

In a tenth aspect, alone or in combination with one or more of the first through ninth aspects, the order prioritizes a primary CC of the plurality of CCs, then one or more secondary CCs of the plurality of CCs.

In an eleventh aspect, alone or in combination with one or more of the first through tenth aspects, method 900 includes configuring the order via radio resource control or medium access control signaling.

In a twelfth aspect, alone or in combination with one or more of the first through eleventh aspects, the slot on the selected CC at least partially overlaps a reference slot, on the reference CC, that is determined based at least in part on the slot offset.

In a thirteenth aspect, alone or in combination with one or more of the first through twelfth aspects, multiple slots overlap the reference slot on the reference CC in time, and the slot on the selected CC is an earliest slot of the multiple slots.

In a fourteenth aspect, alone or in combination with one or more of the first through thirteenth aspects, method 900 includes transmitting configuration indicating which CC, of the plurality of CCs, is the reference CC.

Although FIG. 9 shows example blocks of method 900, in some aspects, method 900 may include additional blocks, fewer blocks, different blocks, or differently arranged blocks than those depicted in FIG. 9. Additionally, or alternatively, two or more of the blocks of method 900 may be performed in parallel.

Figure 10:
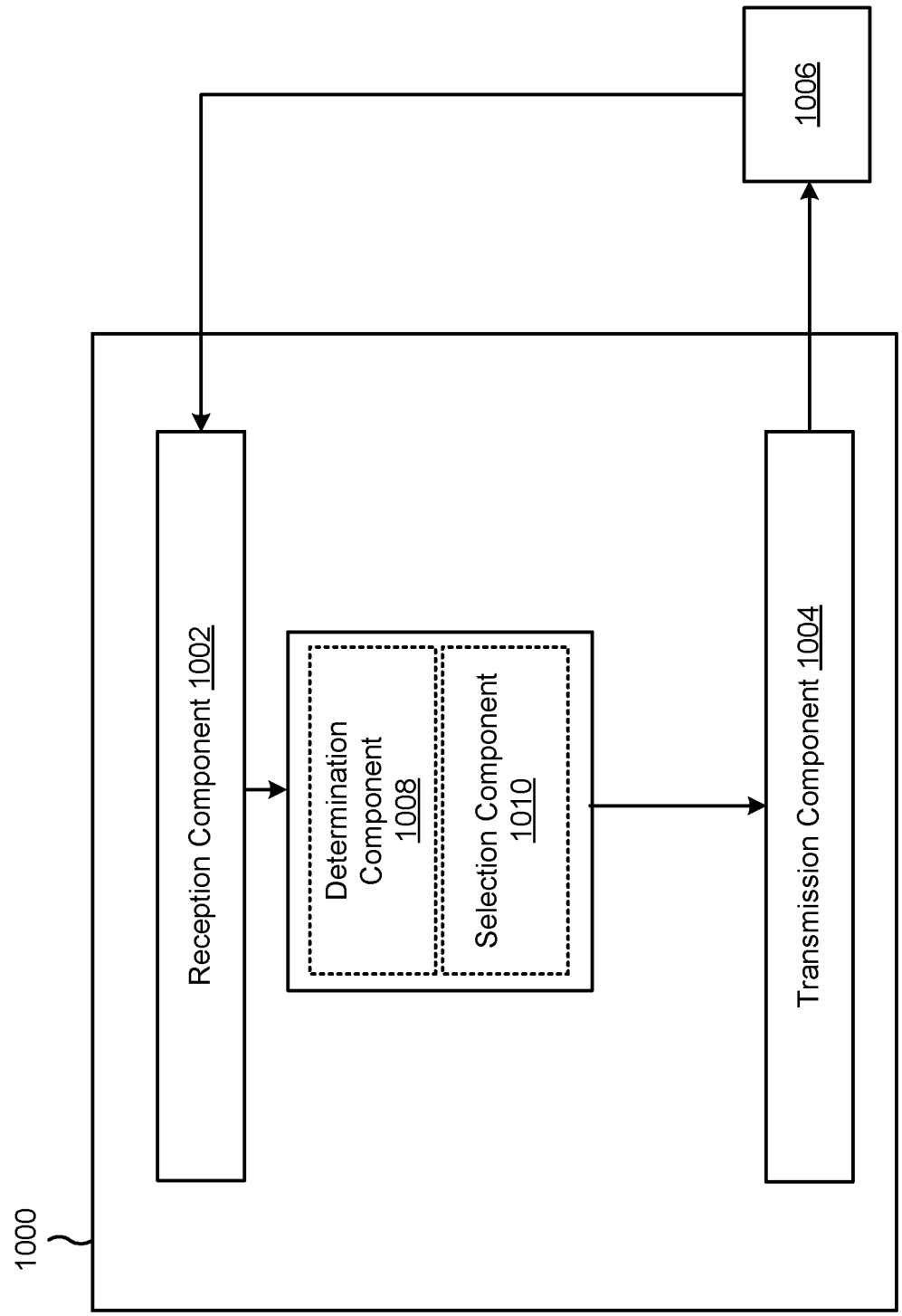
FIG. 10 is a block diagram of an example apparatus for wireless communication.

FIG. 10 is a block diagram of an example apparatus 1000 for wireless communication. The apparatus 1000 may be a UE, or a UE may include the apparatus 1000. In some aspects, the apparatus 1000 includes a reception component 1002 and a transmission component 1004, which may be in communication with one another (for example, via one or more buses and/or one or more other components). As shown, the apparatus 1000 may communicate with another apparatus 1006 (such as a UE, a base station, or another wireless communication device) using the reception component 1002 and the transmission component 1004. As further shown, the apparatus 1000 may include a determination component 1008, among other examples.

In some aspects, the apparatus 1000 may be configured to perform one or more operations described herein in connection with FIGS. 3-7. Additionally or alternatively, the apparatus 1000 may be configured to perform one or more processes described herein, such as method 800 of FIG. 8. In some aspects, the apparatus 1000 and/or one or more components shown in FIG. 10 may include one or more components of the UE described above in connection with FIG. 2. Additionally, or alternatively, one or more components shown in FIG. 10 may be implemented within one or more components described above in connection with FIG. 2. Additionally or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The reception component 1002 may receive communications, such as reference signals, control information, data communications, or a combination thereof, from the apparatus 1006. The reception component 1002 may provide received communications to one or more other components of the apparatus 1000. In some aspects, the reception component 1002 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 1006. In some aspects, the reception component 1002 may include one or more antennas, a demodulator, a MIMO detector, a receive processor, a controller/processor, a memory, or a combination thereof, of the UE described above in connection with FIG. 2.

The transmission component 1004 may transmit communications, such as reference signals, control information, data communications, or a combination thereof, to the apparatus 1006. In some aspects, one or more other components of the apparatus 1006 may generate communications and may provide the generated communications to the transmission component 1004 for transmission to the apparatus 1006. In some aspects, the transmission component 1004 may perform signal processing on the generated communications (such as filtering, amplification, modulation, digital-to-analog conversion, multiplexing, interleaving, mapping, or encoding, among other examples), and may transmit the processed signals to the apparatus 1006. In some aspects, the transmission component 1004 may include one or more antennas, a modulator, a transmit MIMO processor, a transmit processor, a controller/processor, a memory, or a combination thereof, of the UE described above in connection with FIG. 2. In some aspects, the transmission component 1004 may be co-located with the reception component 1002 in a transceiver.

The reception component 1002 may receive a downlink channel on one of a plurality of CCs included in a control channel group. The determination component 1008 may determine, based at least in part on a reference CC of the plurality of CCs and a slot offset, a selected CC and a slot on the selected CC for transmission of feedback regarding the downlink channel. In some aspects, the determination component 1008 may include one or more antennas, a demodulator, a MIMO detector, a receive processor, a modulator, a transmit MIMO processor, a transmit processor, a controller/processor, a memory, or a combination thereof, of the UE described above in connection with FIG. 2. The transmission component 1004 may transmit the feedback regarding the downlink channel based at least in part on the slot.

The selection component 1010 may select a CC, of the plurality of CCs, on which to transmit the control channel. In some aspects, the selection component 1010 may include one or more antennas, a demodulator, a MIMO detector, a receive processor, a modulator, a transmit MIMO processor, a transmit processor, a controller/processor, a memory, or a combination thereof, of the UE described above in connection with FIG. 2.

The number and arrangement of components shown in FIG. 10 are provided as an example. In practice, there may be additional components, fewer components, different components, or differently arranged components than those shown in FIG. 10. Furthermore, two or more components shown in FIG. 10 may be implemented within a single component, or a single component shown in FIG. 10 may be implemented as multiple, distributed components. Additionally or alternatively, a set of (one or more) components shown in FIG. 10 may perform one or more functions described as being performed by another set of components shown in FIG. 10.

Figure 11:
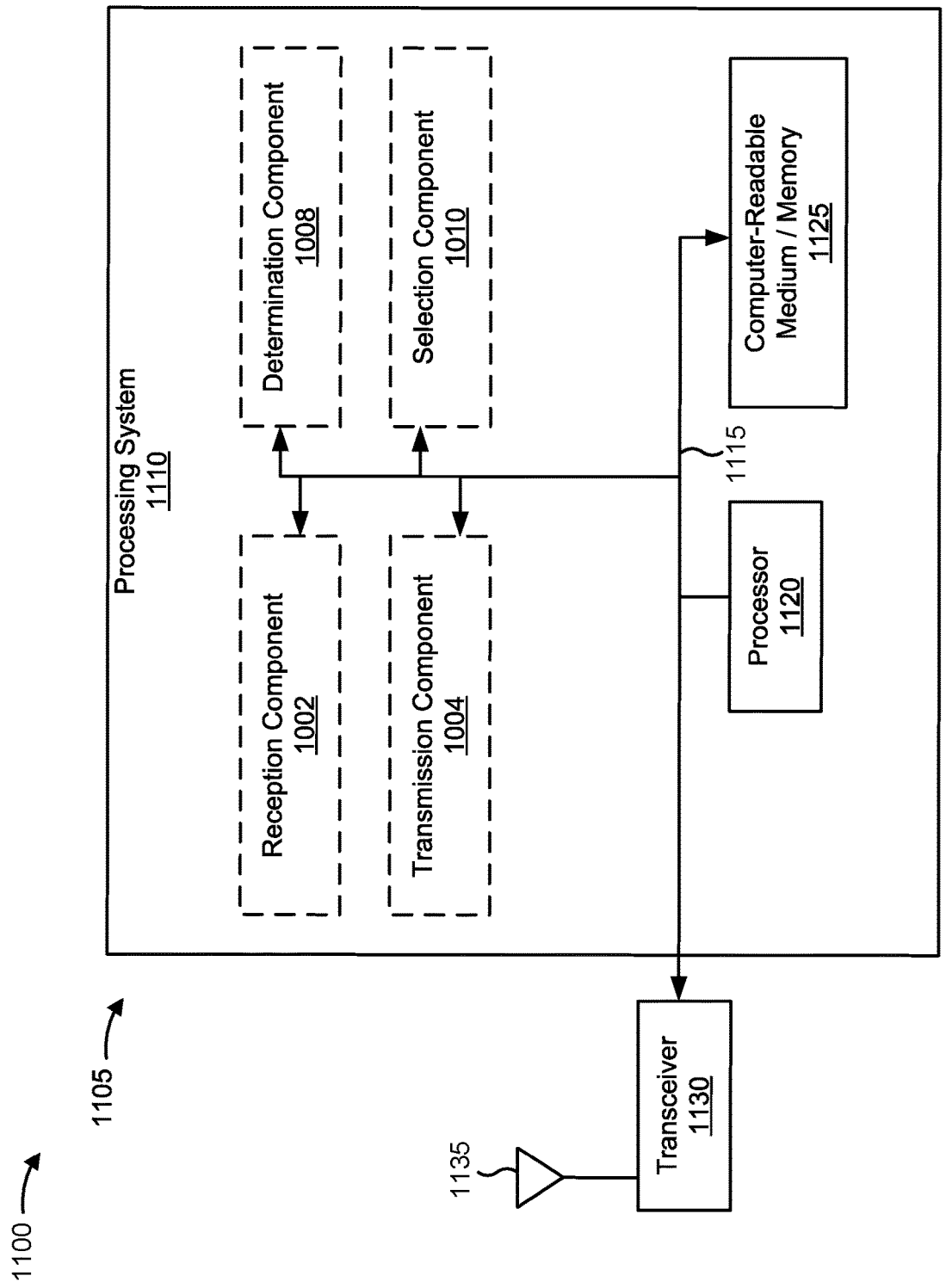
FIG. 11 is a diagram illustrating an example of a hardware implementation for an apparatus employing a processing system.

FIG. 11 is a diagram illustrating an example 1100 of a hardware implementation for an apparatus 1105 employing a processing system 1110. The apparatus 1105 may be a UE.

The processing system 1110 may be implemented with a bus architecture, represented generally by the bus 1115. The bus 1115 may include any number of interconnecting buses and bridges depending on the specific application of the processing system 1110 and the overall design constraints. The bus 1115 links together various circuits including one or more processors and/or hardware components, represented by the processor 1120, the illustrated components, and the computer-readable medium/memory 1125. The bus 1115 may also link various other circuits, such as timing sources, peripherals, voltage regulators, power management circuits, and/or the like.

The processing system 1110 may be coupled to a transceiver 1130. The transceiver 1130 is coupled to one or more antennas 1135. The transceiver 1130 provides a means for communicating with various other apparatuses over a transmission medium. The transceiver 1130 receives a signal from the one or more antennas 1135, extracts information from the received signal, and provides the extracted information to the processing system 1110, specifically the reception component 1002. In addition, the transceiver 1130 receives information from the processing system 1110, specifically the transmission component 1004, and generates a signal to be applied to the one or more antennas 1135 based at least in part on the received information.

The processing system 1110 includes a processor 1120 coupled to a computer-readable medium/memory 1125. The processor 1120 is responsible for general processing, including the execution of software stored on the computer-readable medium/memory 1125. The software, when executed by the processor 1120, causes the processing system 1110 to perform the various functions described herein for any particular apparatus. The computer-readable medium/memory 1125 may also be used for storing data that is manipulated by the processor 1120 when executing software. The processing system further includes at least one of the illustrated components. The components may be software modules running in the processor 1120, resident/stored in the computer readable medium/memory 1125, one or more hardware modules coupled to the processor 1120, or a combination thereof.

In some aspects, the processing system 1110 may be a component of the UE 120 and may include the memory 282 and/or at least one of the TX MIMO processor 266, the RX processor 258, and/or the controller/processor 280. In some aspects, the apparatus 1105 for wireless communication includes means for receiving a downlink channel on one of a plurality of CCs included in a control channel group; means for determining, based at least in part on a reference CC of the plurality of CCs and a slot offset, a selected CC and a slot on the selected CC for transmission of feedback regarding the downlink channel; and means for transmitting the feedback regarding the downlink channel based at least in part on the slot. The aforementioned means may be one or more of the aforementioned components of the apparatus 1000 and/or the processing system 1110 of the apparatus 1105 configured to perform the functions recited by the aforementioned means. As described elsewhere herein, the processing system 1110 may include the TX MIMO processor 266, the RX processor 258, and/or the controller/processor 280. In one configuration, the aforementioned means may be the TX MIMO processor 266, the RX processor 258, and/or the controller/processor 280 configured to perform the functions and/or operations recited herein.

FIG. 11 is provided as an example. Other examples may differ from what is described in connection with FIG. 11.

Figure 12:
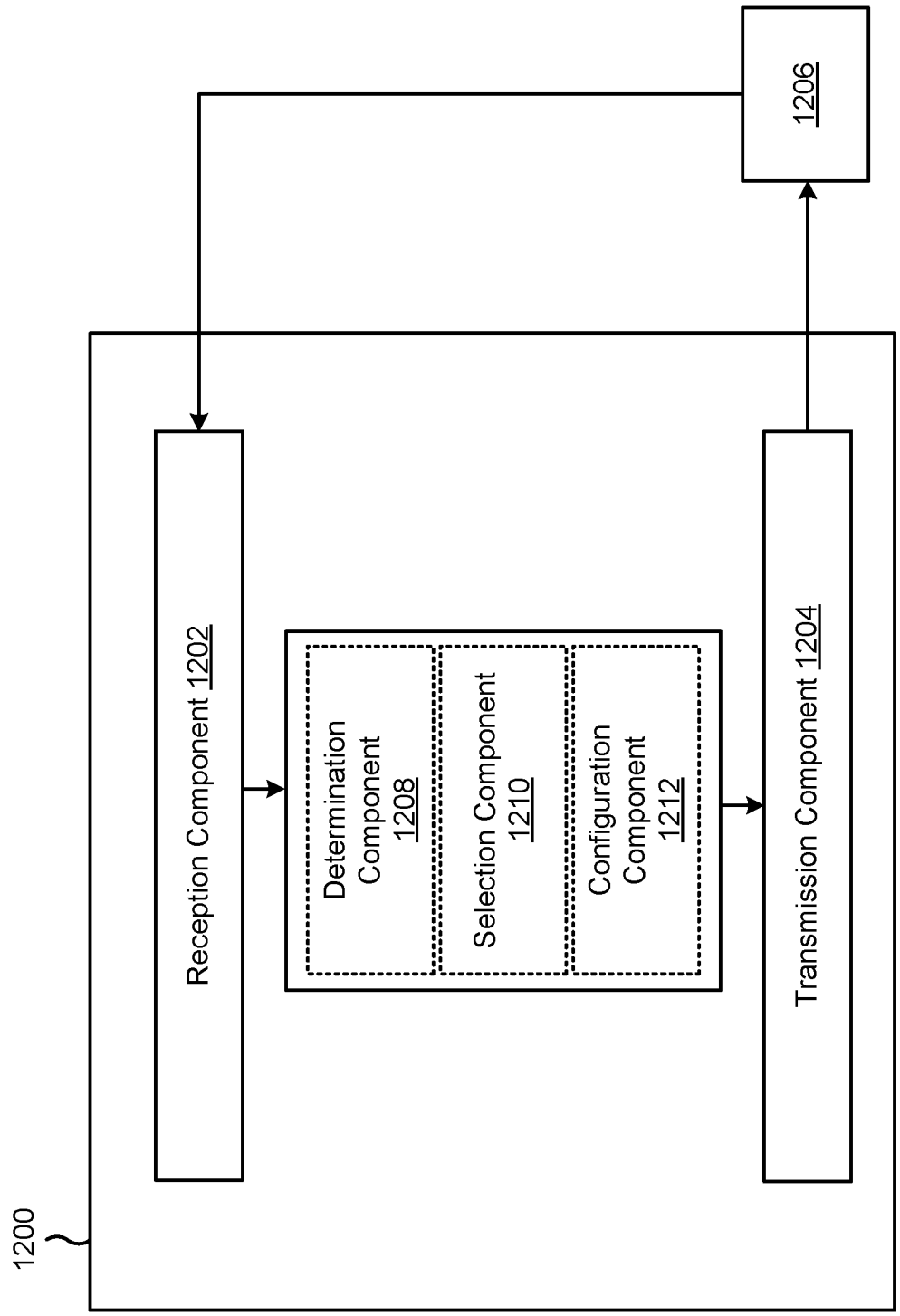
FIG. 12 is a block diagram of an example apparatus for wireless communication.

FIG. 12 is a block diagram of an example apparatus 1200 for wireless communication. The apparatus 1200 may be a base station, or a base station may include the apparatus 1200. In some aspects, the apparatus 1200 includes a reception component 1202 and a transmission component 1204, which may be in communication with one another (for example, via one or more buses and/or one or more other components). As shown, the apparatus 1200 may communicate with another apparatus 1206 (such as a UE, a base station, or another wireless communication device) using the reception component 1202 and the transmission component 1204. As further shown, the apparatus 1200 may include one or more of a determination component 1208, a selection component 1210, or a configuration component 1212, among other examples.

In some aspects, the apparatus 1200 may be configured to perform one or more operations described herein in connection with FIGS. 3-7. Additionally or alternatively, the apparatus 1200 may be configured to perform one or more processes described herein, such as method 900 of FIG. 9. In some aspects, the apparatus 1200 and/or one or more components shown in FIG. 12 may include one or more components of the base station described above in connection with FIG. 2. Additionally, or alternatively, one or more components shown in FIG. 12 may be implemented within one or more components described above in connection with FIG. 2. Additionally or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The reception component 1202 may receive communications, such as reference signals, control information, data communications, or a combination thereof, from the apparatus 1206. The reception component 1202 may provide received communications to one or more other components of the apparatus 1200. In some aspects, the reception component 1202 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 1206. In some aspects, the reception component 1202 may include one or more antennas, a demodulator, a MIMO detector, a receive processor, a controller/processor, a memory, or a combination thereof, of the base station described above in connection with FIG. 2.

The transmission component 1204 may transmit communications, such as reference signals, control information, data communications, or a combination thereof, to the apparatus 1206. In some aspects, one or more other components of the apparatus 1206 may generate communications and may provide the generated communications to the transmission component 1204 for transmission to the apparatus 1206. In some aspects, the transmission component 1204 may perform signal processing on the generated communications (such as filtering, amplification, modulation, digital-to-analog conversion, multiplexing, interleaving, mapping, or encoding, among other examples), and may transmit the processed signals to the apparatus 1206. In some aspects, the transmission component 1204 may include one or more antennas, a modulator, a transmit MIMO processor, a transmit processor, a controller/processor, a memory, or a combination thereof, of the base station described above in connection with FIG. 2. In some aspects, the transmission component 1204 may be co-located with the reception component 1202 in a transceiver.

The transmission component 1204 may transmit a downlink channel on one of a plurality of CCs included in a control channel group. The determination component 1208 may determine, based at least in part on a reference CC of the plurality of CCs and a slot offset, a slot for reception of feedback regarding the downlink channel. In some aspects, the determination component 1208 may include one or more antennas, a demodulator, a MIMO detector, a receive processor, a modulator, a transmit MIMO processor, a transmit processor, a controller/processor, a memory, or a combination thereof, of the base station described above in connection with FIG. 2. The reception component 1202 may receive the feedback regarding the downlink channel based at least in part on the slot. The transmission component 1204 may transmit control information indicating the reference CC. The selection component 1210 may select a CC, of the plurality of CCs, for transmission of the control channel. In some aspects, the selection component 1210 may include one or more antennas, a demodulator, a MIMO detector, a receive processor, a modulator, a transmit MIMO processor, a transmit processor, a controller/processor, a memory, or a combination thereof, of the base station described above in connection with FIG. 2.

The configuration component 1212 may configure the order via radio resource control or medium access control signaling. In some aspects, the configuration component 1212 may include one or more antennas, a demodulator, a MIMO detector, a receive processor, a modulator, a transmit MIMO processor, a transmit processor, a controller/processor, a memory, or a combination thereof, of the base station described above in connection with FIG. 2.

The number and arrangement of components shown in FIG. 12 are provided as an example. In practice, there may be additional components, fewer components, different components, or differently arranged components than those shown in FIG. 12. Furthermore, two or more components shown in FIG. 12 may be implemented within a single component, or a single component shown in FIG. 12 may be implemented as multiple, distributed components. Additionally or alternatively, a set of (one or more) components shown in FIG. 12 may perform one or more functions described as being performed by another set of components shown in FIG. 12.

Figure 13:
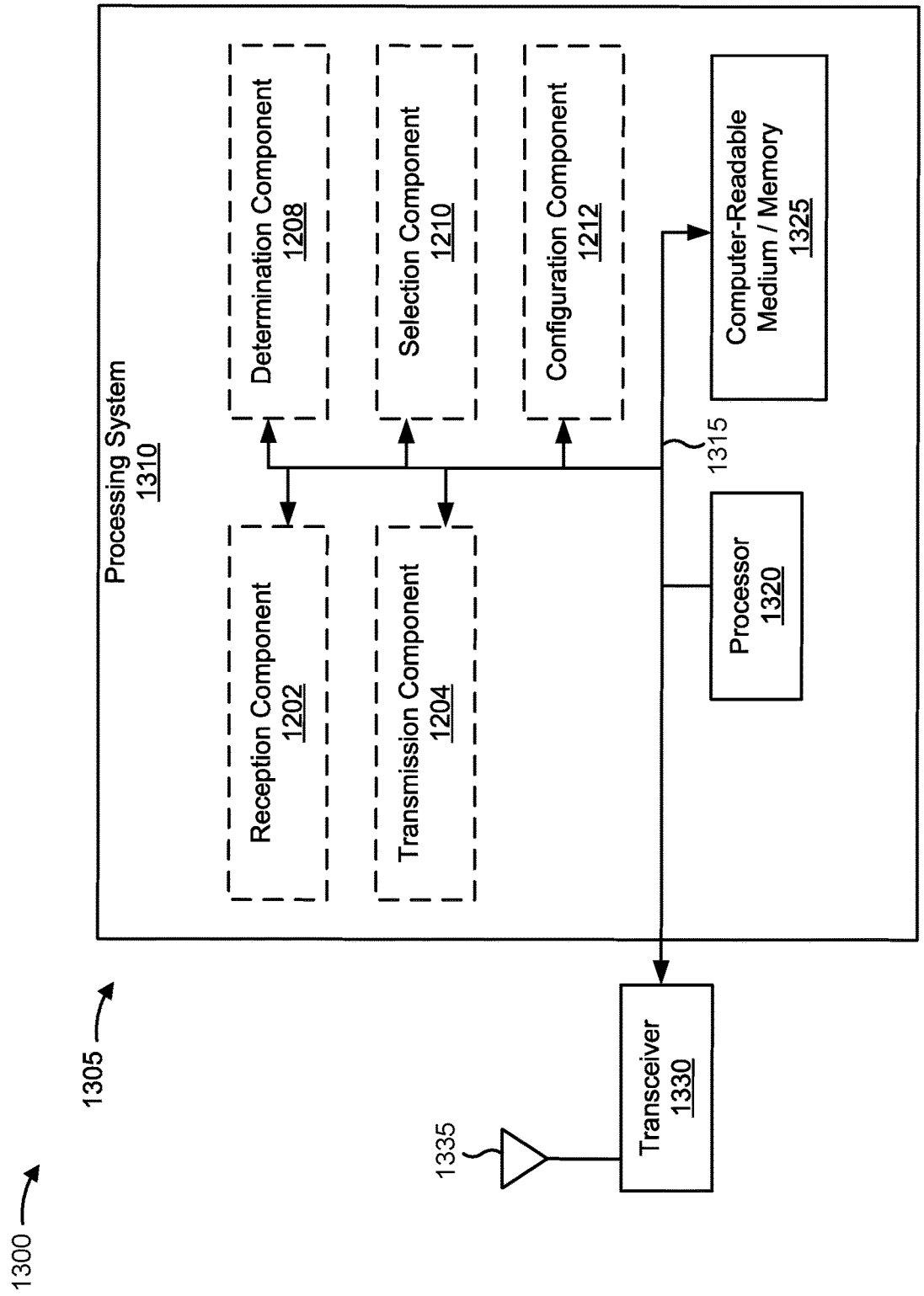
FIG. 13 is a diagram illustrating an example of a hardware implementation for an apparatus employing a processing system.

FIG. 13 is a diagram illustrating an example 1300 of a hardware implementation for an apparatus 1305 employing a processing system 1310. The apparatus 1305 may be a base station.

The processing system 1310 may be implemented with a bus architecture, represented generally by the bus 1315. The bus 1315 may include any number of interconnecting buses and bridges depending on the specific application of the processing system 1310 and the overall design constraints. The bus 1315 links together various circuits including one or more processors and/or hardware components, represented by the processor 1320, the illustrated components, and the computer-readable medium/memory 1325. The bus 1315 may also link various other circuits, such as timing sources, peripherals, voltage regulators, power management circuits, and/or the like.

The processing system 1310 may be coupled to a transceiver 1330. The transceiver 1330 is coupled to one or more antennas 1335. The transceiver 1330 provides a means for communicating with various other apparatuses over a transmission medium. The transceiver 1330 receives a signal from the one or more antennas 1335, extracts information from the received signal, and provides the extracted information to the processing system 1310 (specifically, the reception component 1202). In addition, the transceiver 1330 receives information from the processing system 1310 (specifically, the transmission component 1204), and generates a signal to be applied to the one or more antennas 1335 based at least in part on the received information.

The processing system 1310 includes a processor 1320 coupled to a computer-readable medium/memory 1325. The processor 1320 is responsible for general processing, including the execution of software stored on the computer-readable medium/memory 1325. The software, when executed by the processor 1320, causes the processing system 1310 to perform the various functions described herein for any particular apparatus. The computer-readable medium/memory 1325 may also be used for storing data that is manipulated by the processor 1320 when executing software. The processing system further includes at least one of the illustrated components. The components may be software modules running in the processor 1320, resident/stored in the computer readable medium/memory 1325, one or more hardware modules coupled to the processor 1320, or a combination thereof.

In some aspects, the processing system 1310 may be a component of the base station 110 and may include the memory 242 and/or at least one of the TX MIMO processor 230, the RX processor 238, and/or the controller/processor 240. In some aspects, the apparatus 1305 for wireless communication includes means for transmitting a downlink channel on one of a plurality of CCs included in a control channel group; means for determining, based at least in part on a reference CC of the plurality of CCs and a slot offset, a slot for reception of feedback regarding the downlink channel; and means for receiving the feedback regarding the downlink channel based at least in part on the slot. The aforementioned means may be one or more of the aforementioned components of the apparatus 1100 and/or the processing system 1310 of the apparatus 1305 configured to perform the functions recited by the aforementioned means. As described elsewhere herein, the processing system 1310 may include the TX MIMO processor 230, the receive processor 238, and/or the controller/processor 240. In one configuration, the aforementioned means may be the TX MIMO processor 230, the receive processor 238, and/or the controller/processor 240 configured to perform the functions and/or operations recited herein.

FIG. 13 is provided as an example. Other examples may differ from what is described in connection with FIG. 13.

The following provides an overview of some Aspects of the present disclosure:

Aspect 1: A method of wireless communication performed by a user equipment (UE), comprising: receiving a downlink channel on one of a plurality of component carriers (CCs) included in a group; and transmitting feedback regarding the downlink channel in a slot on a selected CC, wherein the selected CC is based at least in part on a reference CC of the plurality of CCs and a slot offset.

Aspect 2: The method of Aspect 1, further comprising: based at least in part on a number of slots indicated by the slot offset and a slot length of the reference CC.

Aspect 3: The method of Aspect 2, wherein determining the slot further comprises performing a count using the number of slots indicated by the slot offset and the slot length of the reference CC.

Aspect 4: The method of any of Aspects 1-3, wherein the downlink channel is scheduled by control information that indicates the reference CC for transmission of the feedback.

Aspect 5: The method of Aspect 4, wherein the control information indicates the slot offset.

Aspect 6: The method of Aspect 4, wherein the feedback is transmitted on the reference CC.

Aspect 7: The method of any of Aspects 1-6, wherein the reference CC is a primary CC of the group, wherein the slot on the selected CC is based at least in part on a number of slots indicated by the slot offset and a slot length of the reference CC.

Aspect 8: The method of any of Aspects 1-5 or 7, wherein the selected CC is a different CC than the reference CC.

Aspect 9: The method of any of Aspects 1-8, wherein the selected CC is based at least in part on an order associated with the plurality of CCs.

Aspect 10: The method of Aspect 9, wherein the order prioritizes a primary CC of the plurality of CCs, then one or more secondary CCs of the plurality of CCs.

Aspect 11: The method of Aspect 9, wherein the order is configured via radio resource control or medium access control signaling.

Aspect 12: The method of any of Aspects 1-11, wherein the slot on the selected CC at least partially overlaps a reference slot on the reference CC, wherein the method further comprises determining the reference slot based at least in part on the slot offset.

Aspect 13: The method of Aspect 12, wherein multiple slots overlap the reference slot on the reference CC in time, and wherein the slot on the selected CC is an earliest slot of the multiple slots.

Aspect 14: The method of any of Aspects 1-13, further comprising: receiving a configuration indicating which CC, of the plurality of CCs, is the reference CC.

Aspect 15: A method of wireless communication performed by a base station, comprising: transmitting a downlink channel on one of a plurality of CCs included in a group; and receiving feedback regarding the downlink channel in a slot of a selected CC, wherein the slot is based at least in part on a reference CC of the plurality of CCs and a slot offset.

Aspect 16: The method of Aspect 15, further comprising: determining the slot based at least in part on a number of slots indicated by the slot offset and a slot length of the reference CC.

Aspect 17: The method of Aspect 16, wherein the method further comprises performing a count using the number of slots indicated by the slot offset and the slot length of the reference CC.

Aspect 18: The method of any of Aspects 15-17, further comprising: transmitting control information indicating the reference CC for transmission of the feedback.

Aspect 19: The method of Aspect 18, wherein the control information indicates the slot offset.

Aspect 20: The method of any of Aspects 15-19, wherein the feedback is received on the reference CC and the method further comprises performing a count on the selected CC using the number of slots.

Aspect 21: The method of any of Aspects 15-20, wherein the reference CC is a primary CC of the group, wherein the slot on the selected CC is based at least in part on a number of slots indicated by the slot offset and a slot length of the reference CC.

Aspect 22: The method of any of Aspects 15-19 or 21, wherein the selected CC is a different CC than the reference CC.

Aspect 23: The method of any of Aspects 15-22, wherein the selected CC is based at least in part on an order associated with the plurality of CCs.

Aspect 24: The method of Aspect 23, wherein the order prioritizes a primary CC of the plurality of CCs, then one or more secondary CCs of the plurality of CCs.

Aspect 25: The method of Aspect 23, further comprising: configuring the order via radio resource control or medium access control signaling.

Aspect 26: The method of any of Aspects 15-25, wherein the slot on the selected CC at least partially overlaps a reference slot on the reference CC, wherein the method comprises determining the reference slot based at least in part on the slot offset.

Aspect 27: The method of Aspect 26, wherein multiple slots overlap the reference slot on the reference CC in time, and wherein the slot on the selected CC is an earliest slot of the multiple slots.

Aspect 28: The method of any of Aspects 15-27, further comprising: transmitting a configuration indicating which CC, of the plurality of CCs, is the reference CC.

Aspect 29: An apparatus for wireless communication at a device, comprising a processor; memory coupled with the processor; and instructions stored in the memory and executable by the processor to cause the apparatus to perform the method of one or more of Aspects 1-28.

Aspect 30: A device for wireless communication, comprising a memory and one or more processors coupled to the memory, the one or more processors configured to perform the method of one or more of Aspects 1-28.

Aspect 31: An apparatus for wireless communication, comprising at least one means for performing the method of one or more of Aspects 1-28.

Aspect 32: A non-transitory computer-readable medium storing code for wireless communication, the code comprising instructions executable by a processor to perform the method of one or more of Aspects 1-28.

Aspect 33: A non-transitory computer-readable medium storing a set of instructions for wireless communication, the set of instructions comprising one or more instructions that, when executed by one or more processors of a device, cause the device to perform the method of one or more of Aspects 1-28.

The foregoing disclosure provides illustration and description, but is not intended to be exhaustive or to limit the aspects to the precise forms disclosed. Modifications and variations may be made in light of the above disclosure or may be acquired from practice of the aspects.

As used herein, the term "component" is intended to be broadly construed as hardware, firmware, and/or a combination of hardware and software. As used herein, a processor is implemented in hardware, firmware, and/or a combination of hardware and software. It will be apparent that systems and/or methods described herein may be implemented in different forms of hardware, firmware, and/or a combination of hardware and software. The actual specialized control hardware or software code used to implement these systems and/or methods is not limiting of the aspects. Thus, the operation and behavior of the systems and/or methods were described herein without reference to specific software code—it being understood that software and hardware can be designed to implement the systems and/or methods based, at least in part, on the description herein.

As used herein, satisfying a threshold may, depending on the context, refer to a value being greater than the threshold, greater than or equal to the threshold, less than the threshold, less than or equal to the threshold, equal to the threshold, not equal to the threshold, or the like.

Even though particular combinations of features are recited in the claims and/or disclosed in the specification, these combinations are not intended to limit the disclosure of various aspects. In fact, many of these features may be combined in ways not specifically recited in the claims and/or disclosed in the specification. Although each dependent claim listed below may directly depend on only one claim, the disclosure of various aspects includes each dependent claim in combination with every other claim in the claim set. As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

No element, act, or instruction used herein should be construed as critical or essential unless explicitly described as such. Also, as used herein, the articles "a" and "an" are intended to include one or more items and may be used interchangeably with "one or more." Further, as used herein, the article "the" is intended to include one or more items referenced in connection with the article "the" and may be used interchangeably with "the one or more." Furthermore, as used herein, the terms "set" and "group" are intended to include one or more items (e.g., related items, unrelated items, or a combination of related and unrelated items), and may be used interchangeably with "one or more." Where only one item is intended, the phrase "only one" or similar language is used. Also, as used herein, the terms "has," "have," "having," or the like are intended to be open-ended terms. Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

What is claimed is:

1. An apparatus for wireless communication, comprising:
a memory; and
one or more processors coupled to the memory, wherein the one or more processors are configured to:
receive a downlink channel on one of a plurality of component carriers (CCs) included in a group; and
transmit feedback regarding the downlink channel in a slot on a selected CC, wherein the slot on the selected CC is based at least in part on a slot length of a reference CC of the plurality of CCs and a number of slots indicated by a slot offset.

2. The apparatus of claim 1, wherein the one or more processors are configured to:
perform a count using the number of slots indicated by the slot offset and the slot length of the reference CC to determine the slot.

3. The apparatus of claim 1, wherein the downlink channel is scheduled by control information that indicates the selected CC for transmission of the feedback, wherein the selected CC is the reference CC, wherein the control information indicates the slot offset, and wherein the one or more processors are configured to perform a count on the selected CC using the number of slots.

4. The apparatus of claim 1, wherein the reference CC is a primary CC of the group.

5. The apparatus of claim 1, wherein the selected CC is a different CC than the reference CC.

6. The apparatus of claim 1, wherein the selected CC is based at least in part on an order associated with the plurality of CCs.

7. The apparatus of claim 6, wherein the order prioritizes a primary CC of the plurality of CCs, then one or more secondary CCs of the plurality of CCs.

8. The apparatus of claim 6, wherein the order is configured via radio resource control or medium access control signaling.

9. The apparatus of claim 1, wherein the slot on the selected CC at least partially overlaps a reference slot on the reference CC, wherein the one or more processors are configured to determine the reference slot based at least in part on the slot offset.

10. The apparatus of claim 9, wherein multiple slots overlap the reference slot on the reference CC in time, and wherein the slot on the selected CC is an earliest slot of the multiple slots.

11. The apparatus of claim 1, wherein the one or more processors are further configured to:
receive a configuration indicating which CC, of the plurality of CCs, is the reference CC.

12. An apparatus for wireless communication, comprising:
a memory; and
one or more processors coupled to the memory, wherein the one or more processors are configured to:
transmit a downlink channel on one of a plurality of component carriers (CCs) included in a group; and
receive feedback regarding the downlink channel in a slot on a selected CC, wherein the slot is based at least in part on a slot length of a reference CC of the plurality of CCs and a number of slots indicated by a slot offset.

13. The apparatus of claim 12, wherein the one or more processors are configured to:
perform a count using the number of slots indicated by the slot offset and the slot length of the reference CC to determine the slot.

14. The apparatus of claim 12, wherein the one or more processors are further configured to:
transmit control information that indicates the selected CC for transmission of the feedback, wherein the selected CC is the reference CC, wherein the control information indicates the slot offset, and wherein the one or more processors are configured to perform a count on the selected CC using the number of slots.

15. The apparatus of claim 12, wherein the reference CC is a primary CC of the group.

16. The apparatus of claim 12, wherein the selected CC is a different CC than the reference CC.

17. The apparatus of claim 12, wherein the selected CC is based at least in part on an order associated with the plurality of CCs.

18. The apparatus of claim 17, wherein the order prioritizes a primary CC of the plurality of CCs, then one or more secondary CCs of the plurality of CCs.

19. The apparatus of claim 17, wherein the one or more processors are further configured to:
configure the order via radio resource control or medium access control signaling.

20. The apparatus of claim 12, wherein the slot on the selected CC at least partially overlaps a reference slot on the reference CC, wherein the one or more processors are configured to determine the reference slot based at least in part on the slot offset.

21. The apparatus of claim 20, wherein multiple slots overlap the reference slot on the reference CC in time, and wherein the slot on the selected CC is an earliest slot of the multiple slots.

22. The apparatus of claim 12, wherein the one or more processors are further configured to:
transmit a configuration indicating which CC, of the plurality of CCs, is the reference CC.

23. A method of wireless communication performed by a user equipment (UE), comprising:
receiving a downlink channel on one of a plurality of component carriers (CCs) included in a group; and
transmitting feedback regarding the downlink channel in a slot on a selected CC, wherein the slot on the selected CC is based at least in part on a slot length of a reference CC of the plurality of CCs and a number of slots indicated by a slot offset.

24. The method of claim 23, wherein the downlink channel is scheduled by control information that indicates the selected CC for transmission of the feedback, wherein the selected CC is the reference CC, wherein the control information indicates the slot offset, and wherein the method further comprises performing a count on the selected CC using the number of slots.

25. A method of wireless communication performed by a base station, comprising:
transmitting a downlink channel on one of a plurality of component carriers (CCs) included in a group; and
receiving feedback regarding the downlink channel in a slot of a selected CC, wherein the slot is based at least in part on a slot length of a reference CC of the plurality of CCs and a number of slots indicated by a slot offset.

26. The method of claim 25, further comprising:
transmitting control information that indicates the selected CC for transmission of the feedback, wherein the selected CC is the reference CC, wherein the control information indicates the slot offset, and the method further comprises performing a count on the selected CC using the number of slots.

27. The method of claim 23, wherein the reference CC is a primary CC of the group.

28. The method of claim 23, wherein the selected CC is a different CC than the reference CC.

29. The method of claim 23, wherein the slot on the selected CC at least partially overlaps a reference slot on the reference CC, wherein the method further comprises determining the reference slot based at least in part on the slot offset.

30. The method of claim 29, wherein multiple slots overlap the reference slot on the reference CC in time, and wherein the slot on the selected CC is an earliest slot of the multiple slots.

* * * * *